(12) United States Patent
Pfeiffer et al.

(10) Patent No.: US 10,380,704 B2
(45) Date of Patent: Aug. 13, 2019

(54) OPERATOR PERFORMANCE RECOMMENDATION GENERATION

(71) Applicant: Deere & Company, Moline, IL (US)

(72) Inventors: Dohn W. Pfeiffer, Bettendorf, IA (US); Sebastian Blank, Kaiserslautern (DE)

(73) Assignee: Deere & Company, Moline, IL (US)

( * ) Notice: Subject to any disclaimer, the term of this patent is extended or adjusted under 35 U.S.C. 154(b) by 855 days.

(21) Appl. No.: 14/271,077

(22) Filed: May 6, 2014

(65) Prior Publication Data

US 2015/0199360 A1 Jul. 16, 2015

Related U.S. Application Data

(63) Continuation-in-part of application No. 14/155,023, filed on Jan. 14, 2014, now Pat. No. 9,892,376.

(51) Int. Cl.
*G06F 16/2457* (2019.01)
*G06Q 50/02* (2012.01)
*G06Q 10/06* (2012.01)

(52) U.S. Cl.
CPC ....... *G06Q 50/02* (2013.01); *G06F 16/24578* (2019.01); *G06Q 10/0639* (2013.01)

(58) Field of Classification Search
CPC ................ G06F 17/3053; G06F 16/24578
USPC ......................................................... 707/723
See application file for complete search history.

(56) References Cited

U.S. PATENT DOCUMENTS

| | | | |
|---|---|---|---|
| 4,951,031 A * | 8/1990 | Strubbe | A01D 41/1273 340/684 |
| 5,585,757 A | 12/1996 | Frey | |
| 5,679,094 A | 10/1997 | Nakamura et al. | |
| 5,734,849 A | 3/1998 | Butcher | |
| 5,751,199 A | 5/1998 | Shiau et al. | |
| 5,755,281 A | 5/1998 | Kang et al. | |
| 6,449,932 B1 | 9/2002 | Cooper et al. | |
| 6,990,459 B2 | 1/2006 | Schneider | |
| 6,999,877 B1 | 1/2006 | Dyer | |
| 7,047,135 B2 | 4/2006 | Dyer | |
| 7,184,892 B1 | 2/2007 | Dyer | |
| 7,333,922 B2 | 2/2008 | Cannon | |
| 7,397,392 B2 | 7/2008 | Mahoney et al. | |
| 8,280,595 B2 | 10/2012 | Foster et al. | |

(Continued)

FOREIGN PATENT DOCUMENTS

| CN | 101622928 A | 1/2010 |
|---|---|---|
| EP | 1111550 A1 | 6/2001 |

(Continued)

OTHER PUBLICATIONS

U.S. Appl. No. 14/155,023 Office Action dated Jul. 20, 2016. 18 Pages.

(Continued)

*Primary Examiner* — Alexandria Y Bromell
(74) *Attorney, Agent, or Firm* — Joseph R. Kelly; Kelly, Holt & Christenson PLLC

(57) ABSTRACT

A set of data is received. The data is indicative of sensed parameters on a mobile machine. The data is evaluated against a set of actionable conditions to determine the degree of fulfillment of each condition. A recommendation for changing the operation of the mobile machine is identified based on the degree of fulfillment. An output is generated based on the recommendation.

23 Claims, 28 Drawing Sheets

(56) References Cited

U.S. PATENT DOCUMENTS

| | | | |
|---|---|---|---|
| 8,469,784 B1* | 6/2013 | Hoskinson | A01D 41/127 460/1 |
| 9,330,062 B2 | 4/2016 | Thurow | |
| 9,892,376 B2 | 2/2018 | Pfeiffer | |
| 10,310,456 B2 | 5/2019 | Blank | |
| 2002/0040300 A1 | 4/2002 | Ell | |
| 2002/0103688 A1 | 8/2002 | Schneider | |
| 2003/0161906 A1 | 8/2003 | Braunhardt | |
| 2005/0150202 A1 | 7/2005 | Quick | |
| 2005/0171660 A1 | 8/2005 | Woolford | |
| 2005/0171835 A1 | 8/2005 | Mook et al. | |
| 2005/0258259 A1* | 11/2005 | Stanimirovic | F24F 11/30 236/49.1 |
| 2006/0187048 A1 | 8/2006 | Curkendall et al. | |
| 2006/0241838 A1 | 10/2006 | Mongiardo | |
| 2006/0287792 A1 | 12/2006 | Jarrett | |
| 2006/0293913 A1 | 12/2006 | Iwig et al. | |
| 2007/0156318 A1 | 7/2007 | Anderson | |
| 2007/0192173 A1 | 8/2007 | Moughler | |
| 2008/0319927 A1 | 12/2008 | Dellmier et al. | |
| 2009/0036184 A1 | 2/2009 | Craessaerts et al. | |
| 2009/0259483 A1 | 10/2009 | Hendrickson et al. | |
| 2009/0312919 A1 | 12/2009 | Foster | |
| 2010/0036696 A1* | 2/2010 | Lang | A01B 79/005 705/7.39 |
| 2010/0071329 A1 | 3/2010 | Hindryckx | |
| 2010/0153409 A1 | 6/2010 | Joshi et al. | |
| 2010/0199257 A1* | 8/2010 | Biggerstaff | G06F 8/456 717/104 |
| 2010/0217481 A1 | 8/2010 | Baumgarten | |
| 2010/0217631 A1 | 8/2010 | Boss et al. | |
| 2011/0251752 A1* | 10/2011 | DeLarocheliere | G07C 5/008 701/31.4 |
| 2011/0270495 A1 | 11/2011 | Knapp | |
| 2012/0215395 A1 | 8/2012 | Aznavorian et al. | |
| 2012/0253744 A1* | 10/2012 | Schmidt | G07C 5/008 702/182 |
| 2012/0260366 A1 | 12/2012 | Heuvelmans | |
| 2012/0323453 A1 | 12/2012 | Havimaki et al. | |
| 2012/0323496 A1 | 12/2012 | Burroughs | |
| 2013/0317872 A1 | 11/2013 | Nakamichi | |
| 2014/0019018 A1* | 1/2014 | Baumgarten | G05B 13/021 701/50 |
| 2014/0025440 A1 | 1/2014 | Nagda et al. | |
| 2014/0122147 A1 | 5/2014 | Christie et al. | |
| 2014/0129048 A1 | 5/2014 | Baumgarten et al. | |
| 2014/0156105 A1 | 6/2014 | Faivre et al. | |
| 2014/0188576 A1 | 7/2014 | de Oliveira et al. | |
| 2014/0172247 A1 | 9/2014 | Thomson | |
| 2014/0277905 A1 | 9/2014 | Anderson | |
| 2015/0046043 A1 | 2/2015 | Bollin | |
| 2015/0064668 A1 | 3/2015 | Manci et al. | |
| 2015/0112546 A1 | 4/2015 | Ochsendorf | |
| 2015/0178661 A1 | 6/2015 | Keaveny et al. | |
| 2015/0199360 A1 | 7/2015 | Pfeiffer | |
| 2015/0199637 A1 | 7/2015 | Pfeiffer et al. | |
| 2015/0199775 A1 | 7/2015 | Pfeiffer et al. | |
| 2015/0366124 A1 | 12/2015 | Krernmer et al. | |
| 2016/0078391 A1 | 3/2016 | Blank | |
| 2016/0088793 A1 | 3/2016 | Bischoff | |
| 2016/0098637 A1 | 4/2016 | Hodel et al. | |
| 2016/0212969 A1 | 7/2016 | Salaki | |
| 2017/0168501 A1 | 6/2017 | Ogura et al. | |
| 2017/0261978 A1 | 9/2017 | Gresch | |
| 2017/0322550 A1 | 11/2017 | Yokoyama | |
| 2018/0196438 A1 | 7/2018 | Newlin et al. | |
| 2018/0359917 A1 | 12/2018 | Blank | |
| 2018/0364652 A1 | 12/2018 | Blank | |
| 2018/0364698 A1 | 12/2018 | Blank | |

FOREIGN PATENT DOCUMENTS

| | | |
|---|---|---|
| EP | 1714822 A2 | 10/2006 |
| EP | 3346347 A1 | 7/2018 |
| WO | 2013096716 A1 | 6/2013 |
| WO | 2013096721 A2 | 6/2013 |
| WO | 2015153809 A1 | 10/2015 |
| WO | 2016115496 A1 | 7/2016 |
| WO | 2016200699 A1 | 12/2016 |

OTHER PUBLICATIONS

U.S. Appl. No. 14/546,725 Restriction Requirement dated Jan. 9, 2017. 8 pages.

International Search Report and Written Opinion for International Application No. PCT/US2014/069541, dated Apr. 15, 2015, date of filing: Dec. 10, 2014, 17 pages.

European Search Report Application No. 14879223.7 dated May 22, 2017, 7 pages.

U.S. Appl. No. 14/546,725 Office Action dated May 26, 2017, 14 pages.

Electronic Fleet Management for Work Truck Fleets, Jun. 20, 2013 2 pages. www.zonarsystems.com.

2013 Buyer's Guide: Fleet Automation Software, http://www.teletrac.com/assets/TT_BuyersGuide_2013.pdf, 10 pages.

Fleet Management: How it works. 2014 Verizon. 3 pages.

U.S. Appl. No. 14/155,023, Final Office Action, dated Mar. 7, 2017. 40 pages.

U.S. Appl. No. 14/546,725 Final Office Action dated Nov. 16, 2017, 23 pages.

U.S. Appl. No. 14/445,699 Office Action dated Mar. 30, 2018, 61 pages.

U.S. Appl. No. 14/546,725 Office Action dated May 11, 2018, 18 pages.

U.S. Appl. No. 14/445,699 Office Action dated Jul. 20, 2018, 70 pages.

Office Action for U.S. Appl. No. 14/445,699, dated Jun. 20, 2017, 40 pages.

U.S. Appl. No. 14/925,237 Final Office Action dated Nov. 5, 2018, 30 pages.

European Patent Application No. 18176691.6-1217 Extended European Search Report dated Oct. 25, 2018, 8 pages.

U.S. Appl. No. 15/626,934 Office Action dated Dec. 13, 2018, 18 pages.

Chinese Patent Application No. 20140068108.2, 1st Office Action dated Oct. 8, 2018, 12 pages. (Chinese Only).

Combine Harvester Instrumentation System for Use in Precision Agricultural, Yap Kin, 2011, 21 pages.

U.S. Appl. No. 15/629,260, Application and Drawings, filed Jun. 21, 2017, 64 pages.

U.S. Appl. No. 15/626,934 Application and Figures filed Jun. 19, 2017, 68 pages.

U.S. Appl. No. 15/626,934 Office Action dated Dec. 11, 2018 20 pages.

U.S. Appl. No. 15/626,967 Prosecution History as of Jan. 16, 2019, 155 pages.

U.S. Appl. No. 14/925,237 Prosecution History as of Jan. 16, 2019, 201 pages.

U.S. Appl. No. 14/546,725 Prosecution History as of Jan. 16, 2019, 304 pages.

U.S. Appl. No. 14/445,699 Prosecution History as of Jan. 16, 2019, 350 pages.

U.S. Appl. No. 15/626,972 Prosecution History as of Mar. 12, 2018, 65 pages.

Chinese Patent Application No. 201480068108.2, dated Oct. 8, 2018, 12 pages.

U.S. Appl. No. 15/980,234 Prosecution History, as of Jan. 24, 2019, 219 pages.

U.S. Appl. No. 15/629,260 Notice of Allowance, dated Apr. 9. 2019, 9 pages.

U.S. Appl. No. 14/445,699 Final Office Action dated Mar. 6, 2019, 66 pages.

U.S. Appl. No. 15/626,967 Notice of Allowance dated Jan. 3, 2019, 6 pages.

Extended European Search Report Application No. 18176687.4 dated Nov. 6, 2018, 6 pages.

(56) References Cited

OTHER PUBLICATIONS

U.S. Appl. No. 15/626,967 Notice of Allowance dated Jun. 5, 2019, 14 pages.
U.S. Appl. No. 15/626,972 Office Action dated Apr. 19, 2019, 14 pages.

* cited by examiner

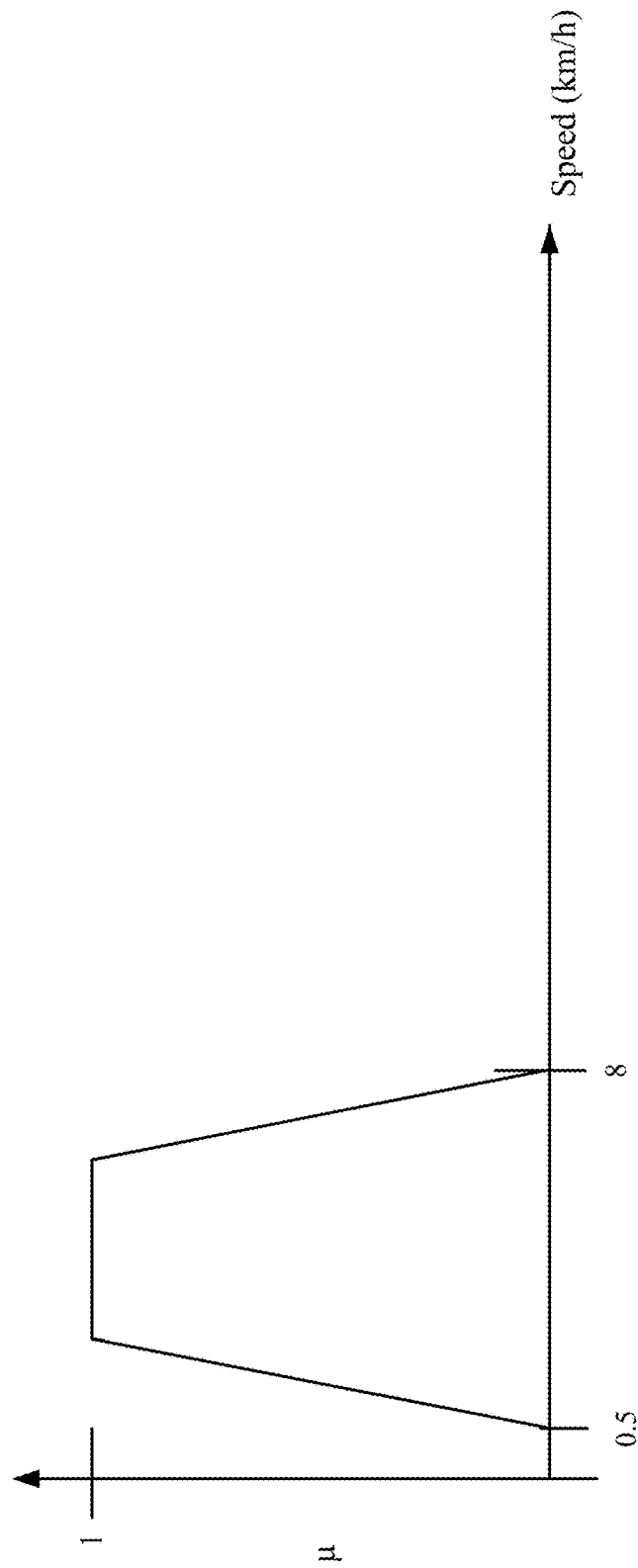

US 10,380,704 B2

OPERATOR PERFORMANCE RECOMMENDATION GENERATION

CROSS-REFERENCE TO RELATED APPLICATION

The present application is a continuation-in-part of and claims priority of U.S. patent application Ser. No. 14/155,023, filed Jan. 14, 2014, the content of which is hereby incorporated by reference in its entirety.

FIELD OF THE DISCLOSURE

The present disclosure relates to mobile equipment. More specifically, the present disclosure relates to generating operator performance reports for operators of mobile equipment.

BACKGROUND

There is a wide variety of different types of equipment that are operated by an operator. This can include, for instance, agricultural equipment, construction equipment, turf and forestry equipment, among others. Many of these pieces of mobile equipment have mechanisms that are controlled by the operator in performing operations. For instance, a combine can have multiple different mechanical, electrical, hydraulic, pneumatic and electro-mechanical subsystems, all of which need to be operated by the operator. The systems may require the operator to set a wide variety of different settings and provide various control inputs in order to control the combine. Some inputs not only include controlling the combine direction and speed, but also concave spacing, sieve settings, rotor speed settings, and a wide variety of other settings and control inputs.

There are currently some existing methods which allow operators or farm equipment managers to obtain dashboard information indicative of the operation of a piece of agricultural equipment. This information is usually informative in nature.

The discussion above is merely provided for general background information and is not intended to be used as an aid in determining the scope of the claimed subject matter.

SUMMARY

A set of data is received. The data is indicative of sensed parameters on a mobile machine. The data is evaluated to determine the level of fulfillment of each of a plurality of actionable conditions. A recommendation for changing the operation of the mobile machine is identified based on the level of fulfillment. An output is generated based on the identified recommendation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 6B-6E are graphs plotting a degree of fulfillment of a parameter corresponding to a rule versus a parameter measurement.

DETAILED DESCRIPTION

Figure 1:
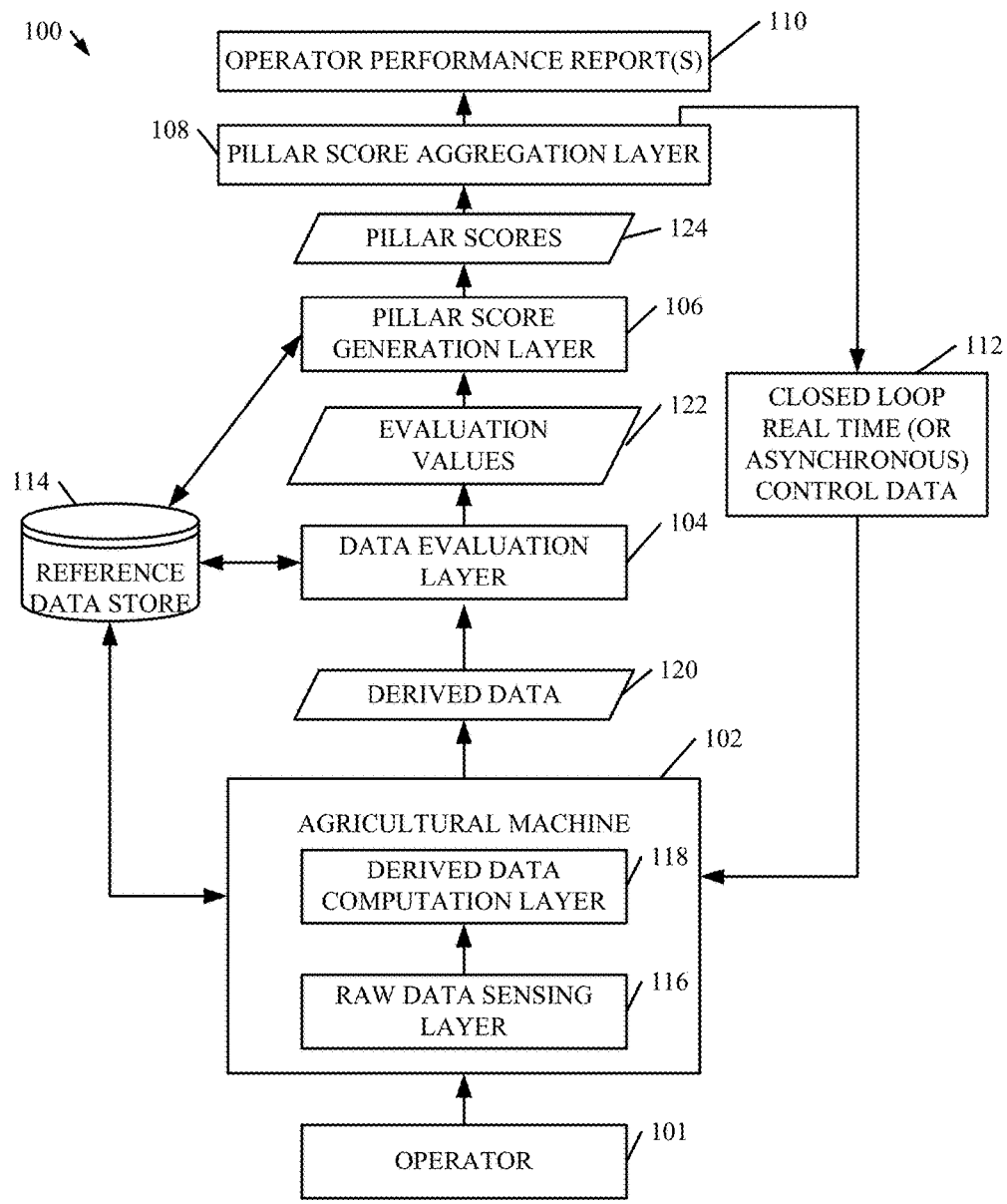
FIG. 1 is a block diagram of one exemplary operator performance computation architecture.

FIG. 1 is a block diagram of one embodiment of a performance report generation architecture 100. Architecture 100 illustratively includes a mobile machine 102, a data evaluation layer 104, a pillar score generation layer 106, and a pillar score aggregation layer 108. Layer 108 generates operator performance reports 110, and can also generate closed loop, real time (or asynchronous) control data 112 which can be provided back to agricultural machine 102. Architecture 100 is also shown having access to a reference data store 114.

In the embodiment shown in FIG. 1, mobile machine 102 is described as being an agricultural machine (and specifically a combine), but this is exemplary only. It could be another type of agricultural mobile machine as well, such as a tractor, a seeder, a cotton harvester, a sugarcane harvester, or others. Also, it could be a mobile machine used in the turf and forestry industries, the construction industry or others. Machine 102 illustratively includes raw data sensing layer 116 and derived data computation layer 118. It will be noted that layer 118 can be provided on machine 102, or elsewhere in architecture 100. It is shown on machine 102 for the sake of example only.

Raw data sensing layer 116 illustratively includes a plurality of different sensors (some of which are described in greater detail below) that sense machine operating parameters as well as environmental data, such as product quality and the type and quality of material being expelled from the agricultural machine 102. The raw data sensor signals are provided from raw data sensing layer 116 to derived data computation layer 118 where some computation is performed on those sensor signals, in order to obtain derived data 120. In one embodiment, derived data computation layer 118 performs computations that do not require a great deal of computational overhead or storage requirements.

Derived data 120 is provided to data evaluation layer 104. In one embodiment, data evaluation layer 104 compares the derived data 120 against reference data stored in reference data store 114. The reference data can be historical data from operator 101, or from a variety of other sources, such as data collected for operators in the fleet for a single farm that employs operator 101, or from relevant data obtained from other operators as well. Data evaluation layer 104 generates evaluation values 122 based upon an evaluation of how the derived data 120 for operator 101 compares to the reference data in data store 114.

Evaluation values 122 are provided to pillar score generation layer 106. Layer 106 illustratively includes a set of score calculators that calculate a performance score 124 for each of a plurality of different performance pillars (or performance categories) that can be used to characterize the performance of operator 101 in operating agricultural machine 102. The particular performance pillars, and associated scores 124, are described in greater detail below.

Each of the pillar scores 124 are provided to pillar score aggregation layer 108. Layer 108 illustratively generates a composite score and operator performance reports 110, based upon the various pillar scores 124 that are received for operator 101. The performance reports can take a wide variety of different forms, and can include a wide variety of different information, some of which is described below in greater detail with respect to FIG. 6. In one embodiment, reports 110 illustratively include the composite score (which is an overall score for operator 101) indicative of the performance of operator 101, and is based upon the individual pillar scores 124 for the individual performance pillars (or performance categories). It can also illustratively include recommendations which are actionable items that can be performed by operator 101, in order to improve his or her performance in operating agricultural machine 102 while considering the included contextual information.

In one embodiment, layer 108 also generates closed loop, real time (or asynchronous) control data 112 which can be fed back to agricultural machine 102. Where the data is fed back in real time, it can be used to adjust the operation, settings, or other control parameters for machine 102, on-the-fly, in order to improve the overall performance. It can also be used to display information to operator 101, indicating the operator's performance scores, along with recommendations of how operator 101 should change the settings, control parameters, or other operator inputs, in order to improve his or her performance. The data can also illustratively be provided asynchronously, in which case it can be downloaded to the agricultural machine 102 intermittently, or at preset times, in order to modify the operation of machine 102.

Figure 2A:
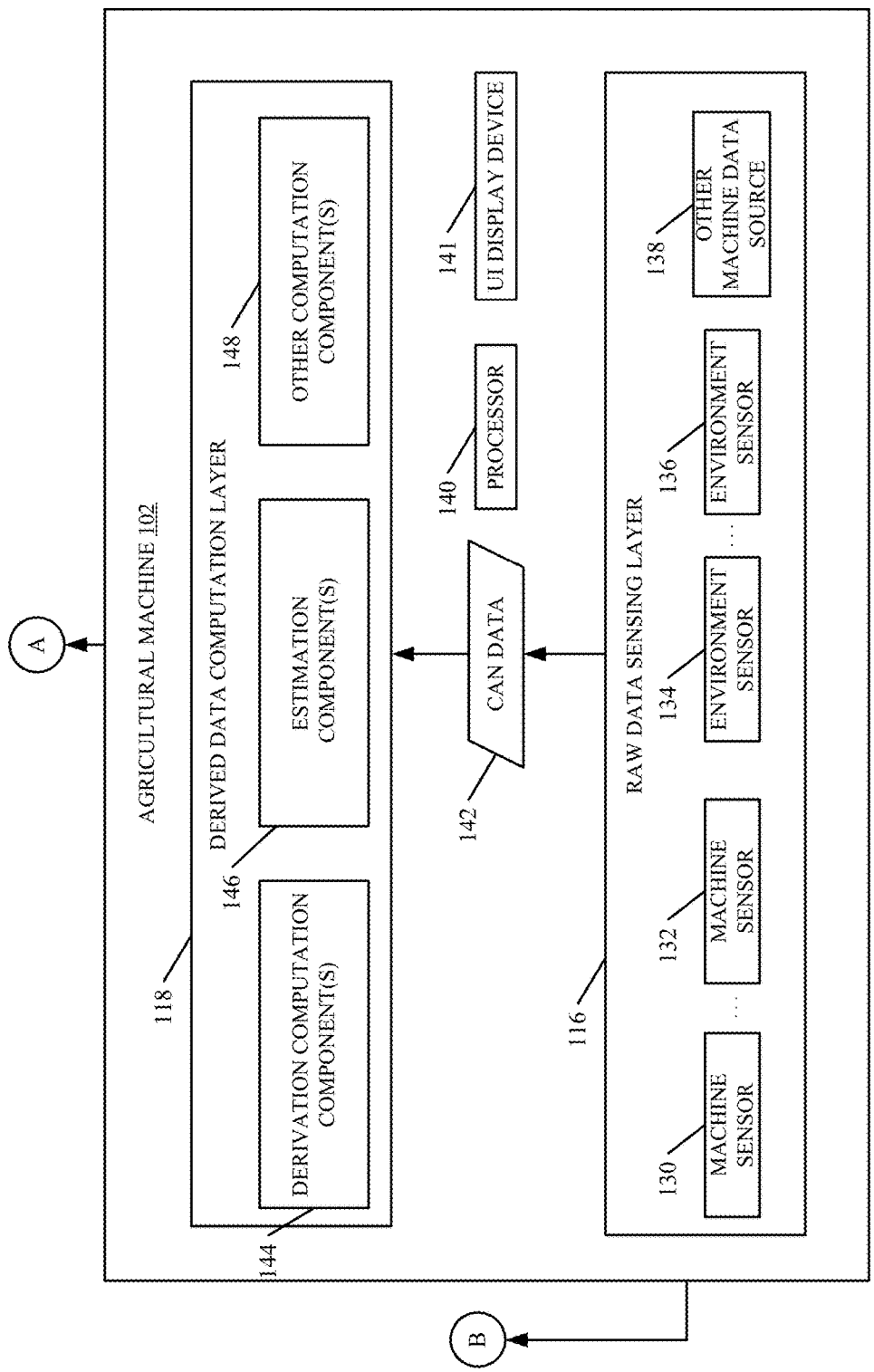
FIGS. 2A and 2B (collectively FIG. 2) is a more detailed block diagram of the architecture shown in FIG. 1.
Figure 2B:
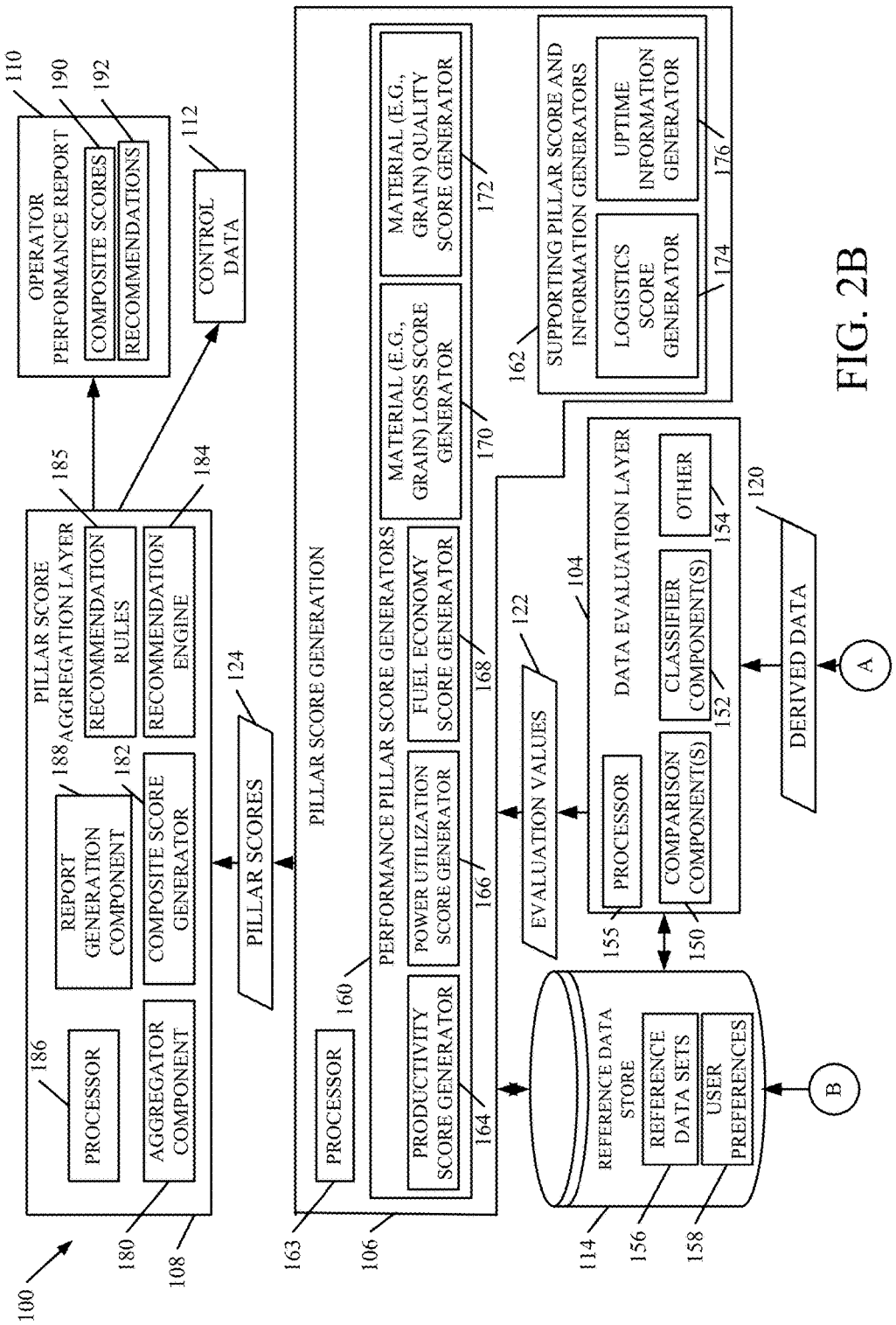

Before describing the overall operation of architecture 100, a more detailed block diagram of one embodiment of the architecture will be described. FIGS. 2A and 2B are collectively referred to as FIG. 2. FIG. 2 shows one embodiment of a more detailed block diagram of architecture 100. Some of the items shown in FIG. 2 are similar to those shown in FIG. 1, and are similarly numbered.

FIG. 2 specifically shows that raw data sensing layer 116 in machine 102 illustratively includes a plurality of machine sensors 130-132, along with a plurality of environment sensors 134-136. Raw data sensing layer 116 can also obtain raw data from other machine data sources 138. By way of example, machine sensors 130-132 can include a wide variety of different sensors that sense operating parameters and machine conditions on machine 102. For instance, they can include speed sensors, mass flow sensors that measure the mass flow of product through the machine, various pressure sensors, pump displacement sensors, engine sensors that sense various engine parameters, fuel consumption sensors, among a wide variety of other sensors, some of which are described in greater detail below.

Environment sensors 134-136 can also include a wide variety of different sensors that sense different things regarding the environment of machine 102. For instance, when machine 102 is a type of harvesting machine (such as a combine), sensors 134-136 can include crop loss sensors that sense an amount of crop that is being lost, as opposed to harvested. In addition, they can include crop quality sensors that sense the quality of the harvested crop. They can also include, for instance, various characteristics of the material that is discarded from machine 102, such as the length and volume of straw discarded from a combine. They can include sensors from mobile devices in the operator's compartment, irrigation sensors or sensor networks, sensors on unmanned aerial vehicles or other sensors. Environment sensors 134-136 can sense a wide variety of other environmental parameters as well, such as terrain (e.g., pitch and roll sensors), weather conditions (such as temperature, humidity, etc.), among others.

Other machine data sources 138 can include a wide variety of other sources. For instance, they can include systems that provide and record alerts or warning messages regarding machine 102. They can include the count and category for each warning, diagnostic code or alert message, and they can include a wide variety of other information as well.

Machine 102 also illustratively includes processor 140 and a user interface display device 141. Display device 141 illustratively generates user interface displays (under control of processor 140 or another component) that allows user 101 to perform certain operations with respect to machine 102. For instance, the user interface displays on the device 141 can include user input mechanisms that allow the user to enter authentication information, start the machine, set certain operating parameters for the machine, or otherwise control machine 102.

In many agricultural machines, data from sensors (such as from raw data sensing layer 116) are illustratively communicated to other computational components within machine 102, such as computer processor 140. Processor 140 is illustratively a computer processor with associated memory and timing circuitry (not separately shown). It is illustratively a functional part of machine 102 and is activated by, and facilitates the functionality of, other layers, sensors or components or other items on machine 102. In one embodiment, the signals and messages from the various sensors in layer 116 are communicated using a controller area network (CAN) bus. Thus, the data from sensing layer 116 is illustratively referred to as CAN data 142.

The CAN data 142 is illustratively provided to derived data computation layer 118 where a number of computations are performed on that data to obtain derived data 120, that is derived from the sensor signals included in CAN data 142. Derived data computation layer 118 illustratively includes derivation computation components 144, estimation components 146 and can include other computation components 148. Derivation computation components 144 illustratively calculate some of the derived data 120 based upon CAN data 142. Derivation computation components 144 can illustratively perform fairly straight forward computations, such as averaging, computing certain values as they occur over time, plotting those values on various plots, calculating percentages, among others.

In addition, derivation computation components 144 illustratively include windowing components that break the incoming data sensor signals into discrete time windows or time frames that are processed both discretely, and relative to data in other or adjacent time windows. Estimation components 146 illustratively include components that estimate derived data. In one embodiment components 146 illustratively perform estimation on plotted points to obtain a function that has a metric of interest. The metric of interest, along with the underlying data, can be provided as derived data 120. This is but one exemplary embodiment of a computation component 144, and a wide variety of others can be used as well. Other computation components 148 can include a wide variety of components to perform other operations. For instance, in one embodiment, components 148 include filtering and other signal conditioning components that filter and otherwise condition the sensor signals received from raw data sensing layer 116. Components 148 can of course include other components as well.

Regardless of the type of components 144, 146 and 148 in layer 118, it will be appreciated that layer 118 illustratively performs computations that require relatively light processing and memory overhead. Thus, in one embodiment, layer 118 is disposed on machine 102 (such as on a device located in the cab or other operator compartment of machine 102) or on a hand held or other mobile device that can be accessed on machine 102 by user 101. In another embodiment, derived data computation layer 118 is located elsewhere, other than on machine 102, and processor 140 communicates CAN data 142 to layer 118 using a communication link (such as a wireless or wired communication link, a near field communication link, or another communication link).

In any case, derived data 120 is obtained from layer 118 and provided to data evaluation layer 104. Again, this can be done by processor 140 (or another processor) using a wireless link (such as a near field communication link, a cellular telephone link, a Wi-Fi link, or another wireless link), or using a variety of hard wired links. Data evaluation layer 104 illustratively includes comparison components 150, one or more classifier components 152, and it can include other components 154 as well. It will be appreciated that, in one embodiment, derived data 120 is illustratively associated with a specific user 101 either by processor 140, or in another way. For instance, when user 101 begins operating machine 102, it may be that processor 140 requests user 101 to enter authentication information (such as a username and password, a personal mobile device serial number, a carried token such as an RFID badge, or other authentication information) when user 101 attempts to start up machine 102. In that way, processor 140 can identify the particular user 101 corresponding to CAN data 142 and derived data 120.

Layer 104 includes comparison components 150, classifier components 152, other components 154 and processor 155. Comparison components 150 illustratively compare the derived data 120 for this operator 101 against reference data stored in reference data store 114. The reference data can include a plurality of different reference data sets 156 and it can also include user preferences 158, which are described in greater detail below. The reference data sets can be used to compare the derived data 120 of user 101 against the user's historical derived data, against data for other operators in the same fleet as user (or operator) 101, or against another set of relevant reference data. In any case, comparison components 150 illustratively perform a comparison of derived data 120 against reference data sets 156. They provide an output indicative of that comparison, and classifier components 152 illustratively classify that output into one of a plurality of different performance ranges (such as good, medium or poor, although these are exemplary and more, fewer, or different ranges can be used). In one embodiment, for instance, comparison component 150 and classifier components 152 comprise fuzzy logic components that employ fuzzy logic to classify the received values into a good category, a medium category or a poor category, based on how they compare to the reference data. In another embodiment, classifier components 152 provide an output value in a continuous rating system. The output value lies on a continuum between good and poor, and indicates operator performance. In the present description, categories are described, but this is for the sake of example only. These categories indicate whether the performance of user 101, characterized by the received derived data values, indicate that the performance of user 101 in operating machine 102 is good, medium or poor, relative to the reference data set to which it was compared.

The classified evaluation values 122 are then provided to pillar score generation layer 106. In the embodiment shown in FIG. 2, pillar score generation layer 106 includes performance pillar score generators 160, supporting pillar score generators 162 and processor 163. Performance pillar score generators 160 illustratively include generators that generate pillar scores corresponding to performance pillars that better characterize the overall performance of operator 101 in various performance categories. In one embodiment, the pillar scores are generated for productivity, power utilization, fuel economy, material loss and material quality. Supporting pillar score generators 162 illustratively generate scores for supporting pillars that, to some degree, characterize the performance of user 101, but perhaps less so than the pillar scores generated by generators 160. Thus, supporting pillar scores include scores for logistics and uptime.

It can thus be seen that, in the present embodiment, performance pillar score generators 160 include productivity score generator 164, power utilization score generator 166, fuel consumption score generator 168, material (e.g., grain) loss score generator 170, and material (e.g., grain) quality score generator 172. Supporting pillar score generators 162 illustratively include logistics score generator 174 and uptime information generator 176.

As one example, productivity score generator 164 can include logic for generating a score based on an evaluation of a productivity versus yield slope in evaluation values 122.

Power utilization score generator 166 illustratively considers information output by the fuzzy logic classifiers 152 in layer 104 that are indicative of an evaluation of the engine power used by machine 102, under the control of user (or operator) 101. It thus generates a supporting pillar score indicative of that evaluation.

Fuel economy score generator 168 can be a logic component that considers various aspects related to fuel economy, and outputs a score based on those considerations. By way of example, where machine 102 is a combine, fuel economy score generator 168 can consider the separator efficiency, the harvest fuel efficiency, and non-productive fuel efficiency that are output by the fuzzy logic components in data evaluation layer 104. Material loss score generator 170 can include items such as the crop type, the measured loss on machine 102 using various loss sensors, an evaluation of the loss using fuzzy logic components, and an evaluation of the tailings, also using fuzzy logic components 152 in data evaluation layer 104. Based upon these considerations, material loss score generator 170 generates a material loss score indicative of the performance of machine 102 (under the operation of user 101) with respect to material loss.

Material quality score generator 172 illustratively includes evaluation values 122 provided by the fuzzy logic components 152 in layer 104 that are indicative of an evaluation of material other than grain that has been harvested, whether the harvested product (such as the corn or wheat) is broken or cracked, and whether the harvested product includes foreign matter (such as cob or chaff), and it can also include evaluation values 122 that relate to the size and quality of the residue expelled from machine 102.

Logistics score generator 174 can include logic that evaluates the performance of the machine 102 during different operations. For instance, it can evaluate the performance of the machine (under the operation of user 101) during unloading, during harvesting, and during idling. It can also include measures such as the distance that the machine traveled in the field and on the road, an individual percentage breakdown in terms of total time, field setup (passes vs. headlands), and other information. This is but one example.

Uptime information generator 176 illustratively generates uptime information (such as a summary) either based on evaluation values 122 provided by layer 104, or based on derived data 120 that has passed through layer 104 to layer 106. The uptime supporting information can be indicative of the performance of the machine based on how much time it is in each machine state, and it can also illustratively consider whether any alert codes or diagnostic trouble codes were generated, and how often they were generated, during the machine operation. In another embodiment only alerts and diagnostics trouble codes that impact the performance are considered. The uptime information is illustratively provided to (or available to) other items in architecture 100, as context information.

All of the pillar scores and supporting pillar scores (indicated by 124 in FIG. 2) are illustratively provided to pillar score aggregation layer 108. Layer 108 illustratively includes an aggregator component 180, composite score generator 182, recommendation engine 184 (that accesses recommendation rules 185), processor 186 and report generator 188. Aggregator component 180 illustratively aggregates all of the pillar scores and supporting pillar scores 124 using a weighting applied to each score. The weighting can be based on user preferences (such as if the user indicates that fuel economy is more important than productivity), they can be default weights, or they can be a combination of default weights and user preferences or other weights. Similarly, the weighting can vary based upon a wide variety of other factors, such as crop type, crop conditions, geography, machine configuration, or other things.

Once aggregator component 180 aggregates and weights the pillar scores 124, composite score generator 182 illustratively generates a composite, overall score, for operator 101, based upon the most recent data received from the operation of machine 102. Recommendation engine 184 generates actionable recommendations which can be performed in order to improve the performance of operator 101. Engine 184 uses the relevant information, pillar score 124, evaluation values 124 and other information as well as, for instance, expert system logic, to generate the recommendations. This is described in greater detail below with respect to FIG. 4A. The recommendations can take a wide variety of different forms.

Once the composite score and the recommendations are generated, report generator component 188 illustratively generates an operator performance report 110 indicative of the performance of operator 101. Operator performance report 110 can be generated periodically, at the request of a manager, at the request of operator 101, or another user, it can be generated daily, weekly, or in other ways. It can also be generated on-demand, while operation is on-going. In one embodiment, operator performance report 110 illustratively includes a composite score 190 generated by composite score generator 182 and the recommendations 192 generated by recommendation engine 194. Layer 108 can also illustratively generate control data 112 that is passed back to machine 102 to adjust the control of machine 102 in order to improve the overall performance.

Report 110 can, in one embodiment, be loaded onto a device so it can be viewed in real time by operator 101, in the operating compartment of vehicle 102, or it can be viewed in real time by a farm manger or others, it can be stored for later access and viewing by operator 101 or other persons, or it can be transmitted (such as through electronic mail or other messaging transmission mechanisms) to a main office, to a farm manager, to the user's home computer, or it can be stored in cloud storage. In one embodiment, it can also be transmitted back to a manufacturer or other training center so that the training for operator 101 can be modified based on the performance reports, or it can be used in other ways as well. Further, the report format and content can be tailored to the intended audience and viewing conditions.

Figure 3:
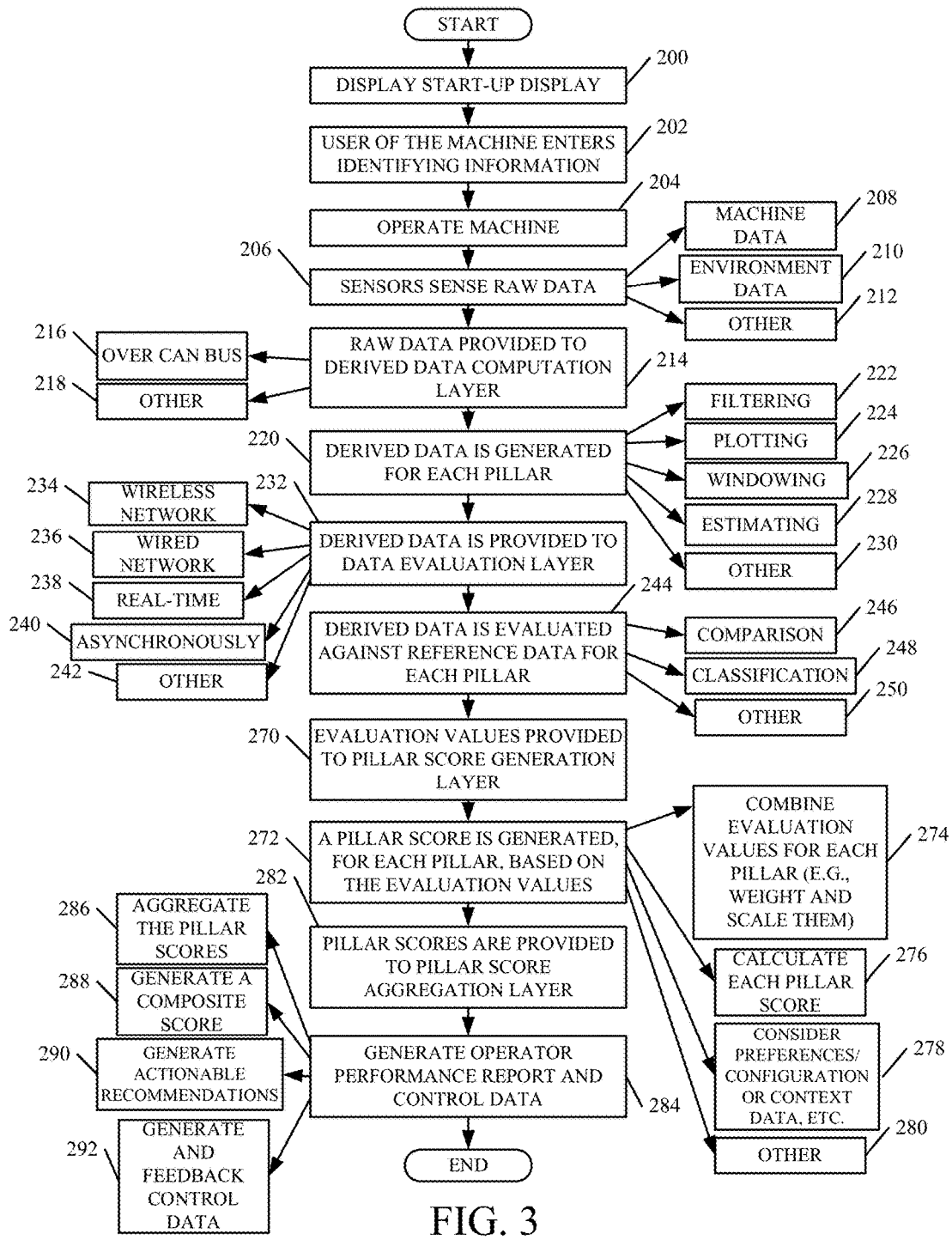
FIG. 3 is a flow diagram illustrating one embodiment of the operation of the architecture shown in FIGS. 1 and 2, in computing performance data indicative of an operator's performance.

FIG. 3 is a flow diagram illustrating one embodiment of the overall operation of the architecture shown in FIG. 2 in generating an operator performance report 110. FIG. 3 will now be described in conjunction with FIGS. 2 and 4. Then, FIGS. 5A-5G will be described to show a more detailed embodiment of portions of architecture 100 used to generate performance pillar scores.

In one embodiment, processor 140 first generates a startup display on user interface display device 141 to allow user 101 to start machine 102. Displaying the startup display is indicated by block 200 in FIG. 3. The user 101 then enters identifying information (such as authentication information or other information). This is indicated by block 202. User 101 then begins to operate machine 102. This is indicated by block 204.

As user 101 is operating the machine, the sensors in raw data sensing layer 116 sense the raw data and provide signals indicative of that data to derived data computation layer 118. This is indicated by block 206 in the flow diagram of FIG. 3. As briefly discussed above, the data can include machine data 208 sensed by machine sensors 130-132. It can also include environmental data 210 sensed by environment sensors 134-136, and it can include other data 212 provided by other machine data sources 138. Providing the raw data to derived data computation layer 118 is indicated by block 214 in FIG. 3. As discussed above, this can be over a CAN bus as indicated by block 216, or in other ways as indicated by block 218.

Derived data 120 is then generated by the components 144, 146 and 148 in layer 118. The derived data is illustratively derived so that data evaluation layer 104 can provide evaluation data used in generating the pillar scores. Deriving the data for each pillar is indicated by block 220 in FIG. 3.

This can include a wide variety of computations, such as filtering 222, plotting 224, windowing 226, estimating 228 and other computations 230.

The derived data 120 is then provided to data evaluation layer 104 which employs comparison components 150 and the fuzzy logic classifier components 152. Providing the data to layer 104 is indicated by block 232 in FIG. 3. It can be provided using a wireless network 234, a wired network 236, it can be provided in real time as indicated by block 238, it can be saved and provided later (such as asynchronously) 240, or it can be provided in other ways 242 as well.

Data evaluation layer 104 then evaluates the derived data against reference data, to provide information for each pillar. This is indicated by block 244 in FIG. 3. The data can be evaluated using comparison 246, using classification 248, or using other mechanisms 250.

Figure 4:
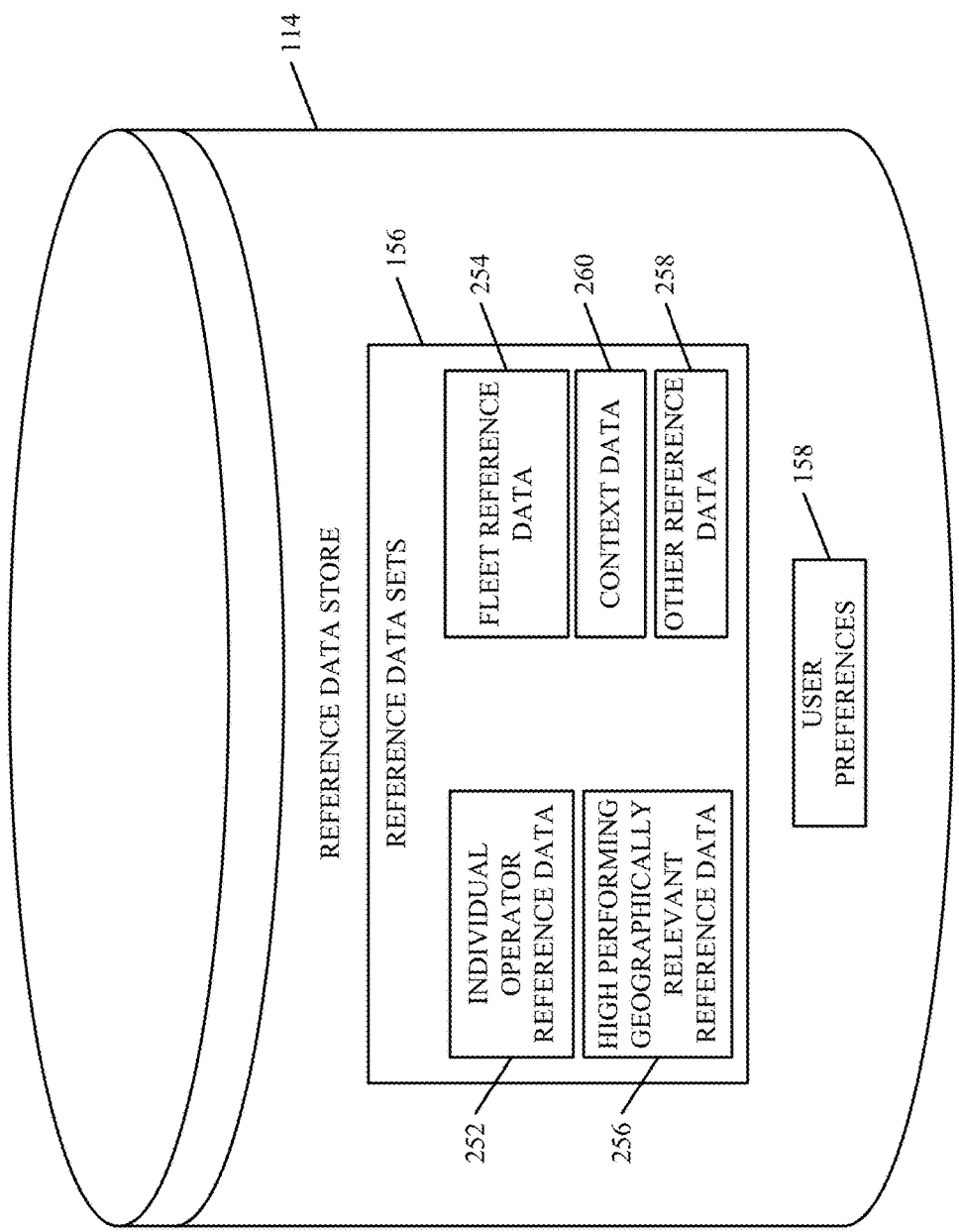
FIG. 4 shows one embodiment of a reference data store in greater detail.

In one embodiment, the comparison components 150 compare the derived data 120 for operator 101 against reference data. FIG. 4 shows a more detailed embodiment of reference data store 114. FIG. 4 shows that, in one embodiment, reference data sets 156 illustratively include individual operator reference data 252. Reference data 252 illustratively includes historical reference data for this specific operator 101. It can also include fleet reference data 254 which comprises reference data corresponding to all of the operators in the fleet to which operator 101 belongs. It can include high performing geographically relevant reference data 256 as well. This illustratively comprises reference data from other operators in a geographically relevant region (such as where the weather, soil type, field sizes, farming practices, etc. are similar to that where operator 101 resides). It can include performance data across various fleets, and the operators that generated the performance data can be identified or anonymous. To generate references for the fuzzy logic components, reference of data for medium and poor performing operations is used. However, comparisons can be made against only high performance data or other subsets of data as well. Also, the data can be for individual operators, or it can be aggregated into a single set of reference data (e.g., for all of the high performing operators in the geographically relevant region, etc.). Of course, it can include other reference data 258 as well.

Also, in the embodiment shown in FIG. 4, the reference data sets 156 illustratively include context data 260. The context data can define the context within which the reference data was gathered, such as the particular machine, the machine configuration, the crop type, the geographic location, the weather, machine states, other information generated by uptime information generator 176, or other information.

It will be noted that the reference data in store 114 can be captured and indexed in a wide variety of different ways. In one embodiment, the raw CAN data 142 can be stored along with the derived data 120, the evaluation values 122, user preferences 158, the pillar scores 124, context data and the recommendations. The data can be indexed by operator, by machine and machine head identifier, by farm, by field, by crop type, by machine state (that is, the state of the machine when the information was gathered, e.g., idle, idle while unloading, waiting to unload, harvesting, harvesting while unloading, field transport, road transport, headland turn, etc.), by settings state (that is, the adjustment settings in the machine including chop setting, drop settings, etc.), and by configuration state (that is, the hardware configuration of the machine). It can be indexed in other ways as well.

Once evaluation layer 104 performs the comparison against the reference data and classifies a measure of that comparison using fuzzy logic heuristics, the evaluation values 122 represent the results of the classification and are provided to pillar score generation layer 106. This is indicated by block 270 in FIG. 3. Pillar score generation layer 106 then generates a pillar score for each performance pillar (and the logistics supporting pillar), based on the plurality of evaluation values 122. This is indicated by block 272 in FIG. 3.

The pillar scores can be generated by combining the evaluation values for each individual pillar, and weighting and scaling them. Other methods like filtering or related data conditioning might be applied as well. This is indicated by block 274. A pillar score generator then calculates a pillar score for each performance pillar (e.g., each performance category) and supporting pillar (e.g., supporting performance category). This is indicated by block 276 in FIG. 3. In doing so, as discussed above, the pillar score generators can illustratively consider user preferences, machine configuration data, context data (e.g., the information generated by logistics information generator 176), or a wide variety of other context data or other data. This is indicated by block 278. The pillar scores can be generated in other ways 280 as well.

Pillar scores 124 are then provided to pillar score aggregation layer 108. This is indicated by block 282 in FIG. 3. Report generator component 188 then generates the operator performance reports 110 based upon the pillar scores, the composite scores, the underlying data, user preferences, context data and the recommendations. Generating the report 110 and control data 112 is indicated by block 284. Doing this by aggregating the pillar scores is indicated by block 286, generating the composite score is indicated by block 288, generating actionable recommendations is indicated by block 290, and generating and feeding back the control data 112 is indicated by block 292.

Figure 4A:
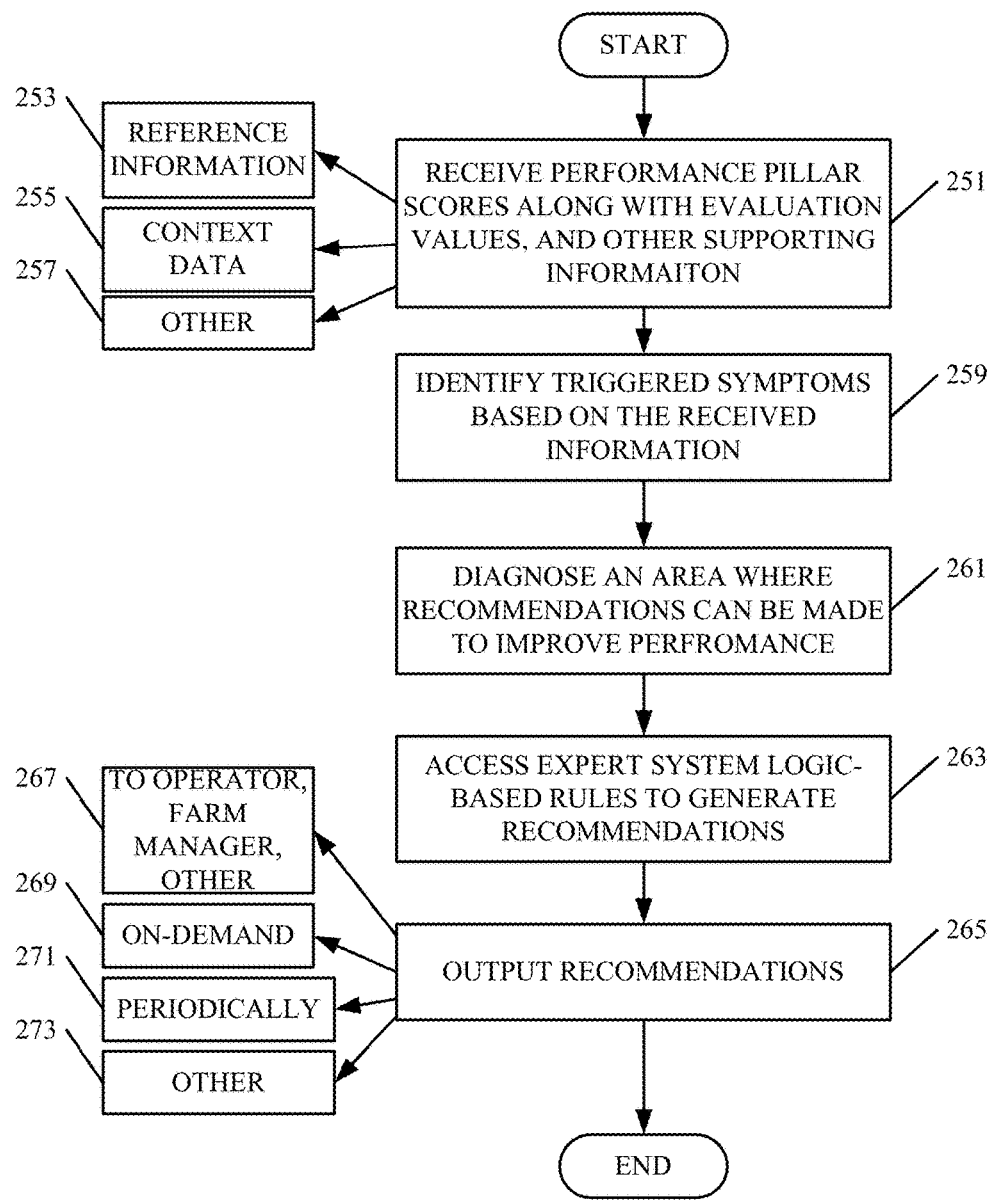
FIG. 4A is a flow diagram illustrating one exemplary embodiment of the operation of a recommendation engine.

Before discussing a more detailed implementation, the operation of recommendation engine 184 in generating recommendations will be described. FIG. 4A is a flow diagram showing one embodiment of this.

FIG. 4A shows a flow diagram illustrating one embodiment of the operation of recommendation engine 184 in FIG. 2. Recommendation engine 184 first receives the performance pillar scores 124, along with the evaluation values 122 and any other desired supporting information from the other parts of the system. This is indicated by block 251 in FIG. 4A. The other data can include reference information 253, context data 255, or a wide variety of other information 257.

Engine 184 then identifies symptoms that are triggered in expert system logic, based on all of the received information. This is indicated by block 259 shown in FIG. 4A.

The expert system logic then diagnoses various opportunities to improve performance based on the triggered symptoms. The diagnosis will illustratively identify areas where recommendations might be helpful in improving performance. This is indicated by block 261 in FIG. 4A.

Engine 184 then accesses expert system, logic-based rules 185 to generate recommendations. This is indicated by block 263. The rules 185 illustratively operate to generate the recommendations based on the diagnosis, the context information and any other desired information.

Engine 184 then outputs the recommendations as indicated by block 265. The recommendations can be output to farm managers or other persons, as indicated by block 267. They can be output on-demand, as indicated by block 269. They can be output intermittently or on a periodic basis (e.g., daily, weekly, etc.) as indicated by block 271, or they can be output in other ways as well, as indicated by block 273.

FIGS. 5A-5G show a more detailed implementation of architecture 100, in which machine 102 is a combine. FIGS. 5A-5G each show a processing channel in architecture 100 for generating a pillar score or a supporting pillar score. FIGS. 5A-5G will now be described as but one example of how architecture 100 can be implemented with a specific type of agricultural machine 102.

Figure 5A:
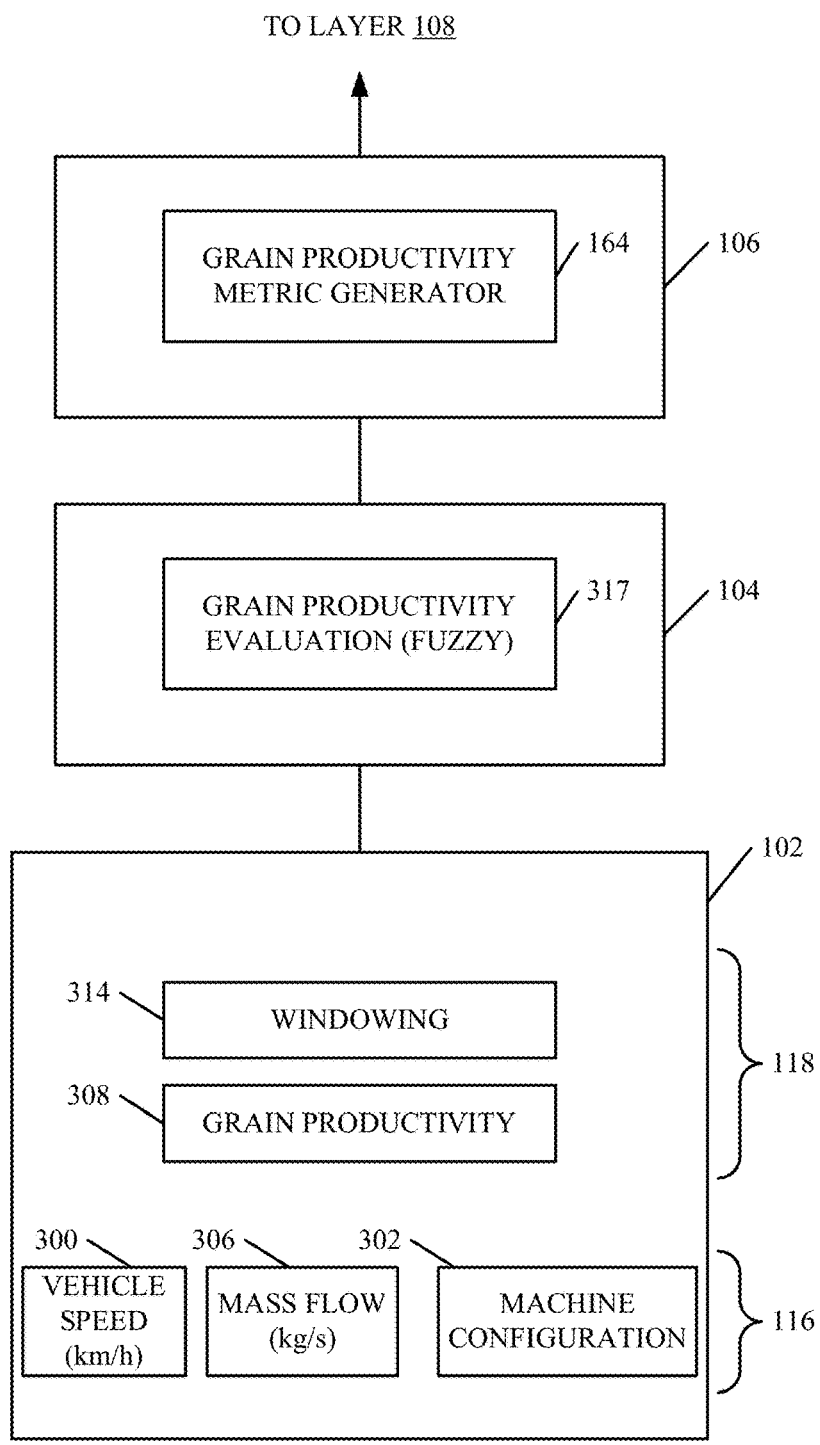
FIGS. 5A-5G are still more detailed block diagrams of different channels for generating different performance pillar scores.

FIG. 5A shows a processing channel in architecture 100 that can be used to generate the productivity pillar score. Some of the items shown in FIG. 5A are similar to those shown in FIG. 2, and they are similarly numbered. In the embodiment shown in FIG. 5A, machine sensors 130-132 in raw data sensing layer 116 illustratively include a vehicle speed sensor 300, a machine configuration identifier 302 and a crop sensor, such as a mass flow sensor 306 that measures mass flow of product through machine 102. The components in derived data computation layer 118 illustratively include components for generating derived data such as a productivity computation component 308 that calculates productivity that indicates the overall grain productivity of machine 102. This can be in tons per hour, tons per hectare or other units or a combination of such metrics. They also include a windowing component 314 that divides the data into temporal windows or time frames and provides it to layer 104.

Evaluation layer 104 illustratively includes a grain productivity fuzzy logic evaluation mechanism 317 that not only compares the output from layer 118 to the various reference data sets 156 in reference data store 114, but also classifies a measure of that comparison. In one embodiment, the output of layer 104 is illustratively a unitless number in a predefined range that indicates whether the operator performed in a good, average or poor range, relative to the reference data to which it was compared. Again, as mentioned above, the good, average or poor categories are exemplary only. Other outputs such as a continuous metric can be used or more, fewer, or different categories could be used as well.

FIG. 5A also shows that pillar score generation layer 106 illustratively includes a grain productivity metric generator that comprises the productivity score generator 164. Generator 164 receives the unitless output of layer 104 and generates a productivity pillar score 124 based on the input. The productivity score is indicative of the productivity performance of operator 101, based upon the current data. This information is provided to layer 108.

Figure 5B:
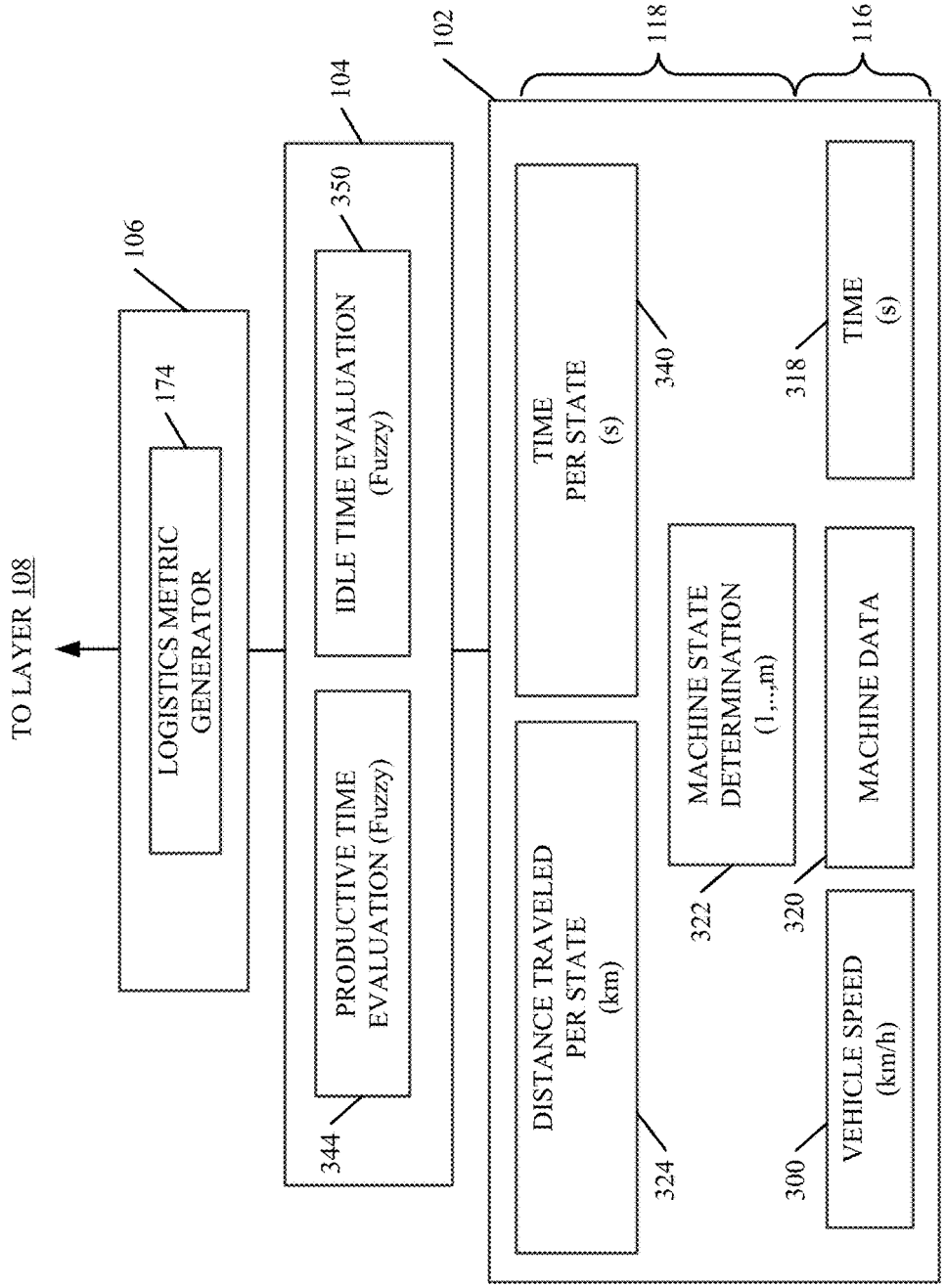

FIG. 5B shows one embodiment of a processing channel in architecture 100 that can be used to generate the logistics supporting pillar score. Some of the items shown in FIG. 5B are similar to those shown in FIG. 2, and they are similarly numbered. FIG. 5B shows that layer 116 includes a time sensor 318 that simply measures the time that machine 102 is running. It also includes a machine state data 320 that identifies when machine 102 is in each of a plurality of different states. A vehicle speed sensor 300 is also shown, although it is already described with respect to FIG. 5A. It can also be a separate vehicle speed sensor as well. Derived data computation layer 118 illustratively includes machine state determination component 322. Based on the machine state data received by sensor 320, component 322 identifies the particular machine state that machine 102 resides in, at any given time. The machine state can include idle, harvesting, harvesting while unloading, among a wide variety of others.

Components in layer 118 also illustratively include a plurality of additional components. Component 324 measures the distance machine 102 travels in each traveling state. Component 340 computes the time machine 102 is in each state. The times can illustratively computed in relative percentages or in units of time.

The output of components 324 and 340, are provided to fuzzy logic components 344 and 350 that compares the data provided by components 324 and 340 against reference data for productive time and idle time and evaluates it against that reference data. Again, in one embodiment, the output of the fuzzy logic components is a unitless value in a predetermined range that indicates whether the performance of operator 101 was good, average or poor relative to the reference data. Layer 104 can include other components for generating other outputs, and it can consider other information from layers 116 and 118 or from other sources.

Logistics metric generator 166 illustratively computes a logistics metric, in the embodiment shown in FIG. 5B, based upon all of the inputs illustrated. The logistics metric is a measure of the operator's logistics performance based on the various comparisons against the reference data sets, and it can be based on other things as well.

Figure 5C:
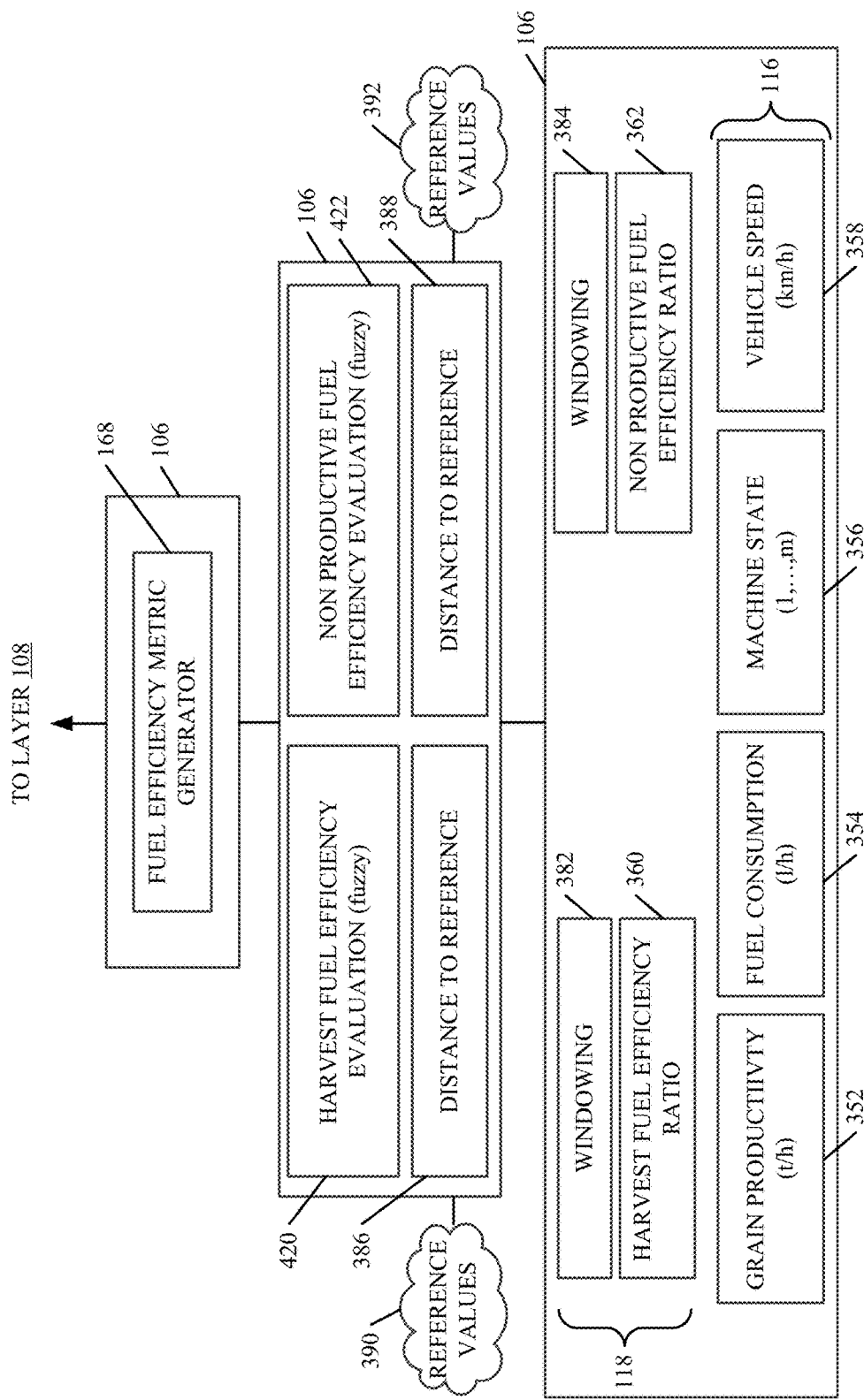

FIG. 5C shows a block diagram of one implementation of a computing channel in architecture 100 for calculating the fuel economy performance pillar score. In the embodiment shown in FIG. 5C, layer 116 illustratively includes a grain productivity sensor (or calculator) 352 that senses (or calculates) grain productivity for the combine (e.g., machine 102). It can be the same as component 308 in FIG. 5A or different. It can provide an output indicative of grain productivity in a variety of different measures or units. It also includes a fuel consumption sensor 354 that measures fuel consumption in units of volume per unit of time. It includes a machine state identifier 356 that identifies machine state (this can be the same as component 322 in FIG. 5B or different), a vehicle speed sensor 358 that measures vehicle speed (which can be the same as sensor 300 in FIG. 5A or different).

Layer 118 includes component 360 that calculates a harvest fuel efficiency ratio for harvesting states and component 362 calculates a non-productive fuel efficiency ratio for non-productive states.

Windowing components 382 and 384 break the data from components 360 and 362 into discrete timeframes. Layer 104 includes average distance components 386 and 388 which receive inputs from reference functions 390 and 392 and output an indication of the distance of the lines fit to the data output by components 382 and 384 from reference functions 390 and 392.

Layer 104 illustratively includes a harvest fuel efficiency evaluator 420, and a non-productive fuel efficiency evaluator 422. Component 420 receives the output from component 386 (and possibly other information) and compares it against reference data, evaluates the measure of that comparison and outputs a value that is indicative of the performance of operator 101 in terms of harvest fuel efficiency. Component 422 does the same thing for non-productive fuel efficiency.

Layer 106 in FIG. 5C illustratively includes a fuel economy metric generator as fuel economy score generator 168 (shown in FIG. 2). It receives the inputs from components 420 and 422 and can also receive other inputs and generates a fuel economy pillar score for operator 101. The fuel economy pillar score is indicative of the fuel economy performance of operator 101, based on the current data collected from machine 102, as evaluated against the reference data.

Figure 5D:
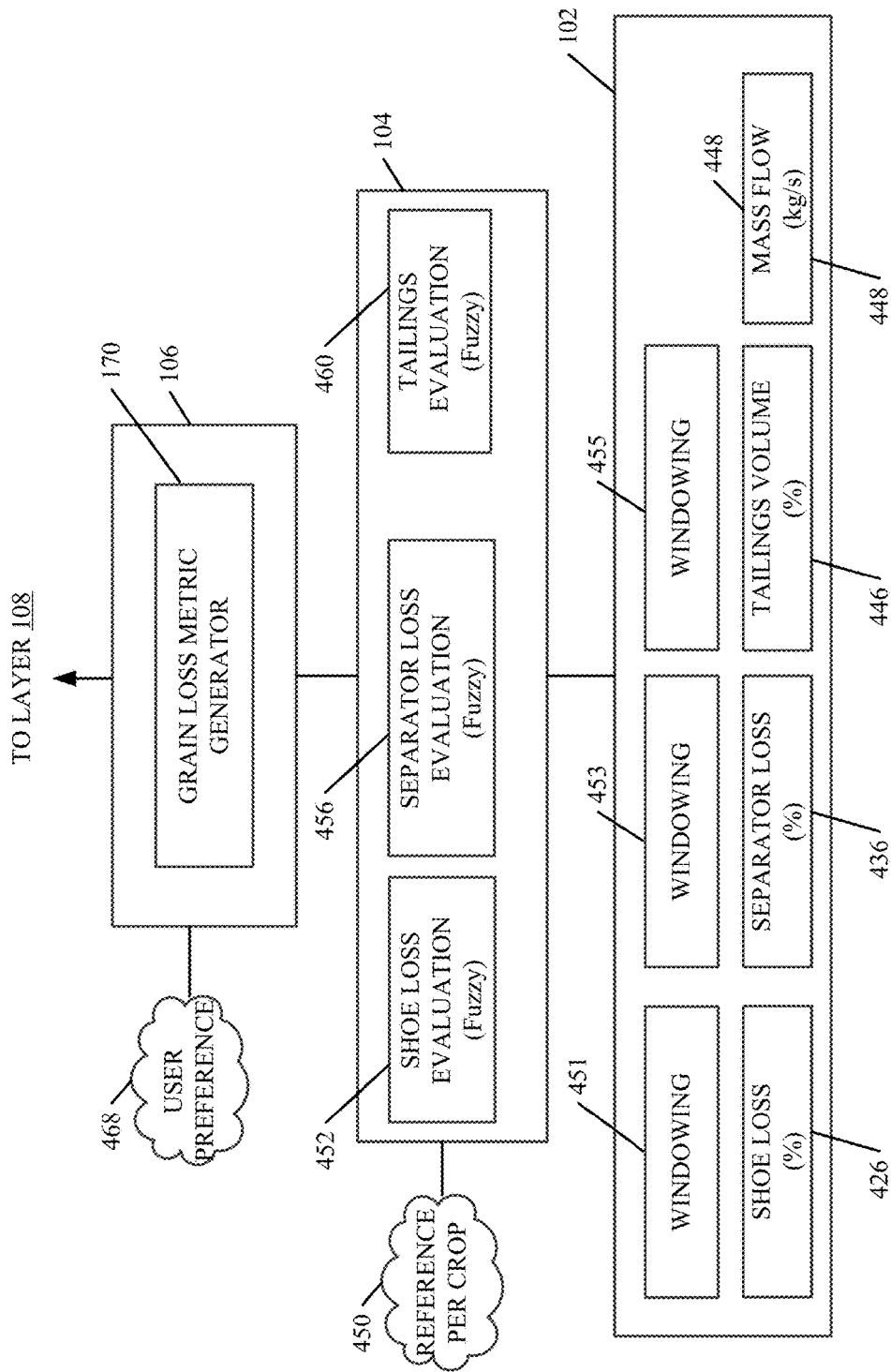

FIG. 5D shows one embodiment of a computing channel in architecture 100 shown in FIG. 2 for calculating the material loss performance pillar score. It can be seen that material loss score generator 170 (from FIG. 2) comprises grain loss metric generator 170 shown in FIG. 5D. In the embodiment shown in FIG. 5D, layer 116 includes a left hand shoe loss sensor component 426 that senses show loss and calculates a total percentage of shoe loss. It also includes separator loss sensor 436 that senses separator loss and computes a total percentage of separator loss, a tailings volume sensor 446 that senses a volume of tailings, and mass flow sensor 448. Sensor 448 can be the same as server 306 in FIG. 5A or different.

Windowing components 451, 453 and 455 receive inputs from components 426, 436 and 448 and break them into discrete time windows. These signals can be filtered and are provided to layer 104. Data evaluation layer 104 illustratively includes shoe total loss evaluator 452, separator total loss evaluator 456, and a tailings evaluator 460.

Total shoe loss evaluator 452 illustratively comprises a fuzzy logic component that receives the total shoe loss from component 451 in layer 118 and compares that against total shoe loss reference data from data store 114. It then evaluates the measure of that comparison to provide a unitless value indicative of whether the performance of operator 101, in terms of total shoe loss, is classified as good, average or poor.

Similarly, separator total loss evaluator 456 each comprises a fuzzy logic component that receives the total separator loss from component 453 and compares it against reference data for total separator loss, and then evaluates the measure of that comparison to determine whether the performance of operator 101, in terms of total separator loss, is classified as good, average or poor.

Tailings evaluator 460 is illustratively a fuzzy logic component that receives an input from component 455, that is indicative of tailings volume and perhaps productivity. It then compares those items against tailings reference data in data store 114 and classifies the measure of that comparison into a good, average or poor classification. Thus, component 460 outputs a unitless value indicative of whether the performance of operator 101, in terms of tailings evaluation, is good, average or poor.

It can also be seen in FIG. 5D that, in one embodiment, all of the evaluator components 452, 456 and 460 receive an input from crop type component 450. Component 450 illustratively informs components 452, 456 and 460 of the crop type currently being harvested. Thus, the evaluator components 452, 456 and 460 can consider this in making the comparisons and classifications, relative to reference data.

Grain loss metric generator 170 receives inputs from the various evaluator components in layer 104 and aggregates those values and computes a performance pillar score for material loss. In doing so, generator 170 illustratively considers user preferences 468 that are provided, relative to material loss. These can be provided in terms of a total percentage, or otherwise. They illustratively indicate the importance that the user places on the various aspects of this particular performance pillar. The output of generator 170 is thus an overall material loss performance score that indicates how operator 101 performed in terms of material loss.

Figure 5E:
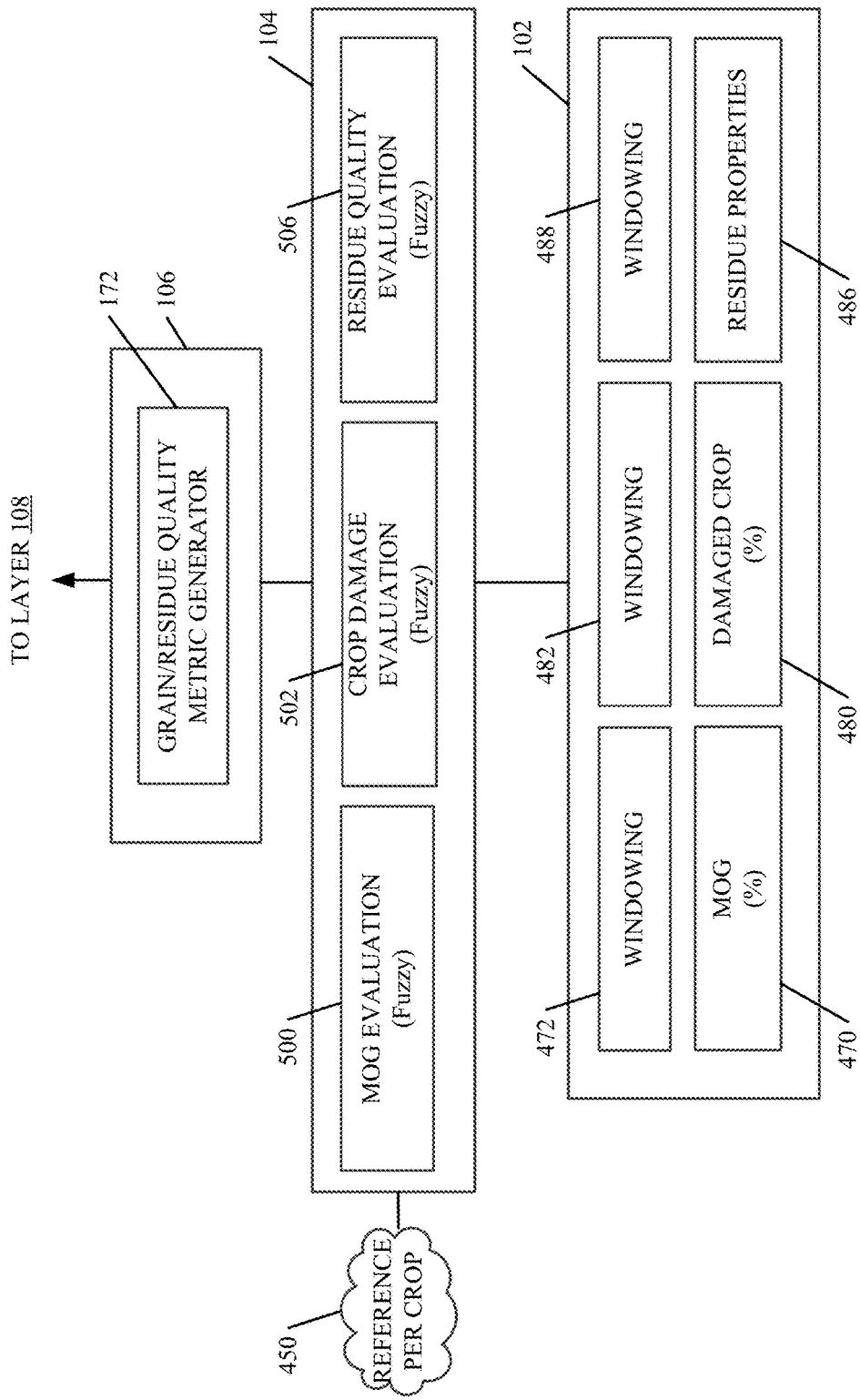

FIG. 5E is a more detailed block diagram showing one embodiment of a computing channel in architecture 100 to obtain a performance pillar score for material quality. Thus, it can be seen that material quality score generator 172 shown in FIG. 2 comprises grain/residue quality metric generator 172 shown in FIG. 5E. FIG. 5E shows that, in one embodiment, raw data sensing layer 116 includes sensor 470 that senses the types of material in the grain elevator. Sensor 470 illustratively senses the volume of material, other than grain, (such as chaff and cobs). Damaged crop sensor 480 illustratively senses the percent of material that is damaged (such as broken, crushed or cracked).

Residue properties sensor 486 can sense various properties of residue. The properties can be the same or different depending on whether the combine is set to chop or windrow.

FIG. 5E shows that derived data computation layer 118 illustratively includes components 472, 482 and 488 that filters the signals from sensors 470, 480 and 486. This can be breaking signals into temporal windows and calculating a representative value for each window or otherwise.

In the embodiment shown in FIG. 5E, data evaluation layer 104 illustratively includes a material other than grain evaluator 500, a crop damage evaluator 502, and a residue quality evaluator 506. It can be seen that components 500, 502 and 508 can all illustratively be informed by user preferences with respect to grain quality thresholds or by reference data 450 for the specific crop type.

In any case, evaluator 500 illustratively receives the input from component 472 in layer 118 and compares the filtered material other than grain value, for light material, against corresponding reference data in data store 114. It then classifies the result of that comparison into a good, average or poor class. The class is thus indicative of whether the performance of operator 101, in terms of material other than grain in the grain elevator, is good, average or poor.

Crop damage evaluator 502 receives the input from component 482 in layer 118 that is indicative of a percent of product in the grain elevator that is damaged. It compares that information against corresponding reference data from reference data store 114 and classifies the result of that comparison into a good, average or poor class. It thus provides a value indicative of whether the performance of operator 101, in terms of the product in the grain elevator being damaged, is good, average or poor.

Residue quality evaluator 506 receives inputs from component 488 in layer 116 and 118 and compares those inputs against corresponding reference data in reference data store 114. It then classifies the result of that comparison into a good, average or poor class. Thus, it provides an output indicative of whether the performance of operator 101, in terms of residue quality, is good, average or poor.

Grain/residue quality metric generator 172 receives inputs from the various components in layer 104 and uses them to calculate a grain/residue quality score for the material quality performance pillar. This score is indicative of the overall performance of operator 101, in operating machine 102, in terms of grain/residue quality. The score is illustratively provided to layer 108.

Figure 5F:
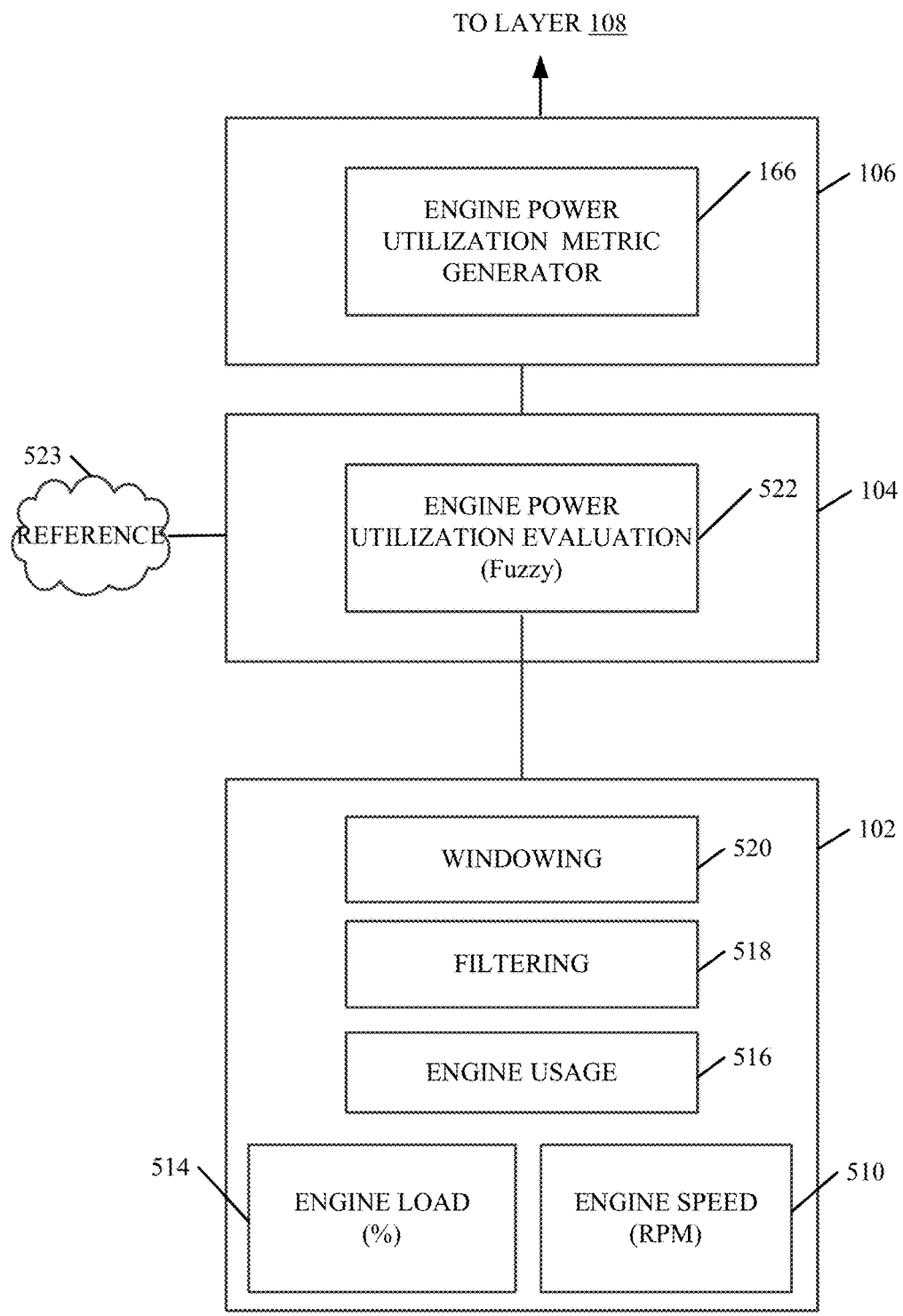

FIG. 5F shows one embodiment of a processing channel in architecture 100 shown in FIG. 2, to calculate the engine power utilization score for the power utilization pillar, on a combine. Thus, power utilization score generator 166 is shown in FIG. 5F. In the embodiment shown in FIG. 5F, raw data sensing layer 116 illustratively includes engine speed sensor 510, and an engine load sensor 514. Layer 118 illustratively includes an engine usage component 516 that receives the inputs from sensors 510 and 514 and calculates engine usage (such as power in kilowatts). Filtering component 518 filters the value from component 518. Windowing component 520 breaks the output from component 518 into discrete temporal windows.

The output from component 520 is provided to layer 104 which includes engine power utilization evaluator 522. Engine power utilization evaluator 522 is illustratively a fuzzy logic component that receives the output from component 520 in layer 118 and compares it against engine power utilization reference data 523 in reference data store 114. It then classifies the result of that comparison into a good, average or poor class. Thus, the output of component 522 is a unitless value that indicates whether the performance of operator 101, in terms of engine power utilization is good, average or poor.

Score generator 174 receives the output from evaluator 522 and calculates a performance pillar score for engine power utilization. The output from component 174 is thus a performance pillar score indicative of whether the overall performance of operator 101, in operating machine 102, is good, average or poor in terms of engine power utilization. The score is illustratively provided to layer 108.

Figure 5G:
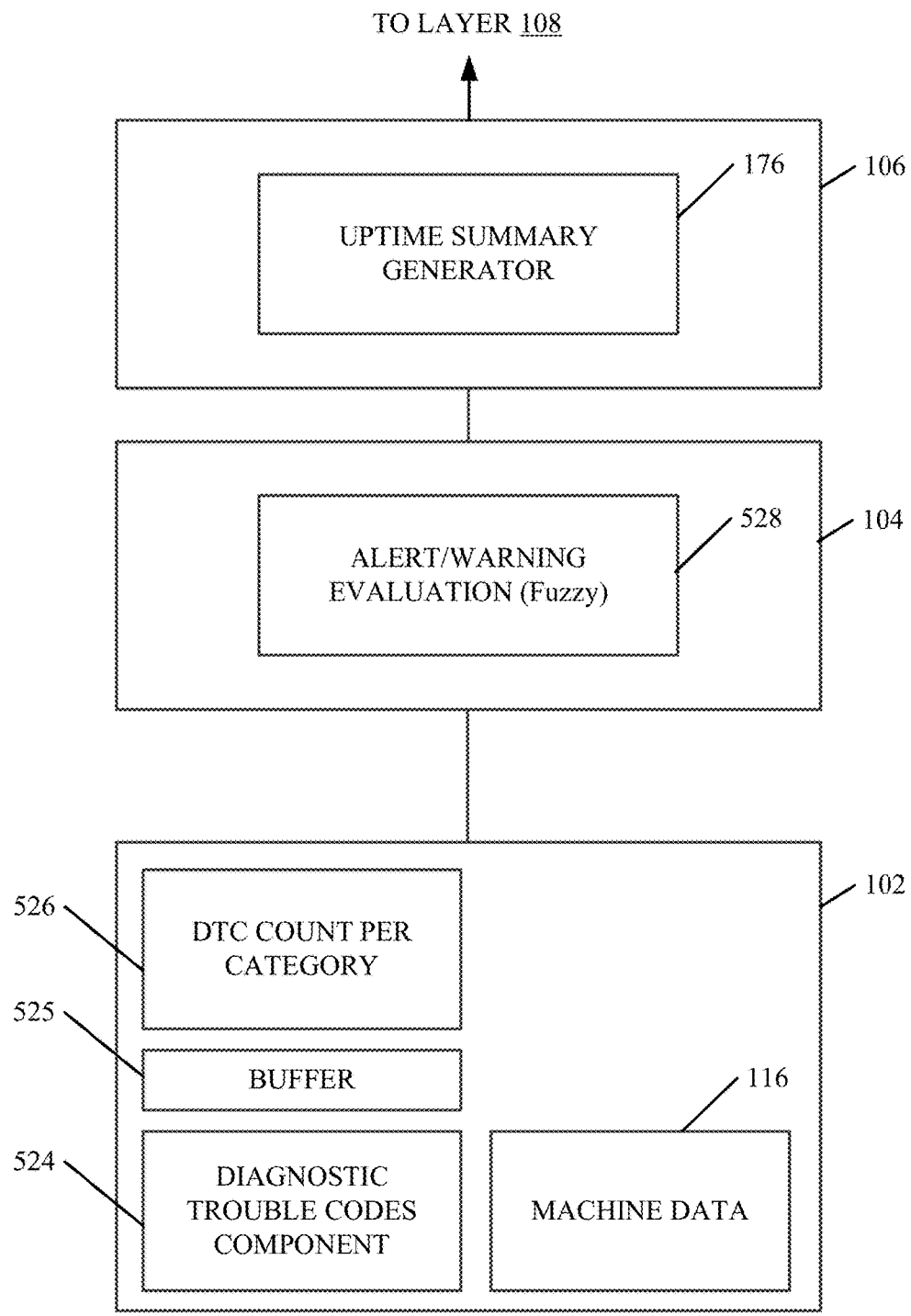

FIG. 5G is a more detailed block diagram showing one embodiment of the architecture 100 shown in FIG. 2 in generating the uptime summary. In the embodiment shown in FIG. 5G, layer 116 includes machine data sensor 116. Machine data sensor 116 illustratively senses a particular machine state that machine 102 is in, and the amount of time it is in a given state. It can also sense other things.

Layer 118 illustratively includes a diagnostic trouble code (DTC) component 524 that generates various diagnostic trouble codes, based upon different sensed occurrences in machine 102. They are buffered in buffer 525. DTC count component 526 calculates the number of DTC occurrences per category, and the number and frequency of occurrence of various alarms and warnings indicated by machine data 116. By way of example, component 526 may calculate the number of times the feeder house gets plugged or the number of other alarms or warnings that indicate that machine 102 is undergoing an abnormally high amount of wear. The alarms and warnings can be event based, time based (such as how many separator hours the machine has used), or based on other things.

Layer 104 includes alert/warning evaluator 528 that compares the various information from machine 102 against reference data to generate information indicative of the operator's performance. The information is provided to summary generator 176.

Uptime summary generator 176 in layer 106 receives the outputs from component 528 and uses them to generate uptime summary information indicative of the performance of operator 101, in operating machine 102, in terms of uptime. The uptime summary information can be provided to layer 108, or used by other parts of the system, or both.

It will be noted that the present discussion describes evaluating data using fuzzy logic. However, this is exemplary only and a variety of other evaluation mechanisms can be used instead. For instance, the data can be evaluated using clustering and cluster analysis, neural networks, supervised or unsupervised learning techniques, support vector machines, Bayesian methods, decision trees, Hidden Markov models, among others. Further, FIGS. 6A-6F below describe how to set up and use a fuzzy logic evaluator to generate recommendations. This is but one example of how the collected data can be evaluated to determine whether it fulfills any of a variety of actionable conditions for which a recommendation can be generated. The other evaluation techniques can be used to determine this as well.

Figure 6A:
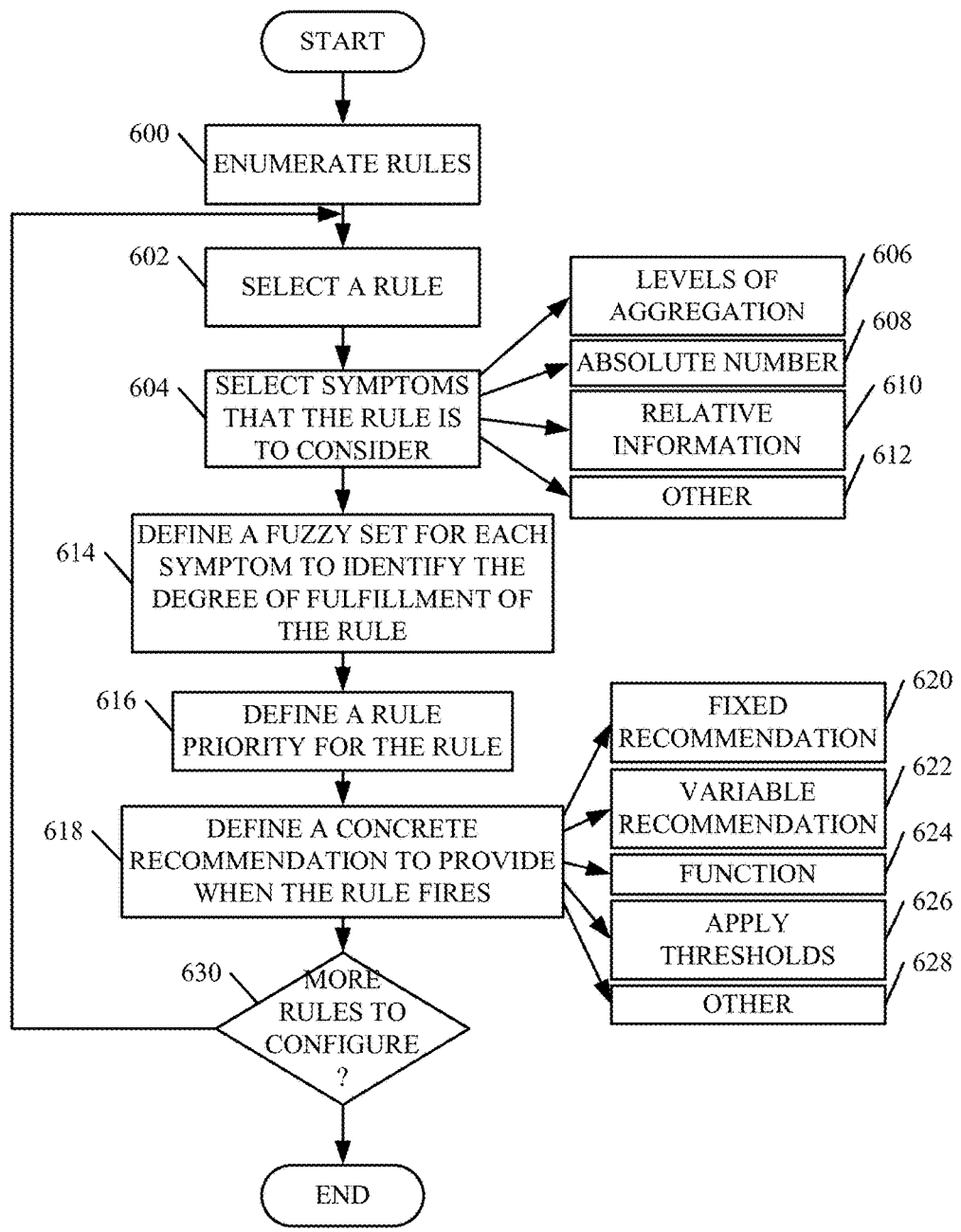
FIG. 6A is a flow diagram illustrating one way in which rules can be configured to generate recommendations.

FIG. 6A is a flow diagram illustrating one embodiment of how recommendation rules 185 can be configured so they can be used by recommendation engine 184 in generating recommendations 192. The rules represent actionable conditions. The collected and sensed data is evaluated against those conditions to see whether the conditions are fulfilled and, if so, the degree of fulfillment. When any of the conditions are met, corresponding recommendations can be output. The overall operation of configuring the rules will first be described with respect to FIG. 6A, and then a number of examples will be provided in order to enhance understanding.

In accordance with one embodiment, the rules that are to be used by recommendation engine 184 are first enumerated. This is indicated by block 600 in FIG. 6A. The rules can be a wide variety of different types of rules, and they can vary in number from a few rules, to tens or hundreds or even thousands of rules. The exact nature of a given rule will vary based upon application, and based upon the mobile machine for which the rule is generated.

Once the rules are enumerated, one of the rules is selected. This is indicated by block 602. For the selected rule, a number of symptoms that are to be considered for the rule are selected. The symptoms to be considered can be obtained from substantially any of the levels set out in FIG. 1, and for which examples were provided in FIGS. 5A-5G. Thus, they can include, for instance, CAN data 142, derived data 120, evaluation values 122, pillar scores 124, composite scores 190, or a host of other data. Selecting the symptoms to be considered by the selected rule is indicated by block 604 in FIG. 6A.

In selecting those symptoms, they can be obtained from different levels of aggregation, as indicated by block 606. They can be reflected by an absolute number 608 or by comparison to reference data 156. They can be compared to user preferences 158, or other information. This type of relative information is indicated by block 610 in FIG. 6A. Of course, the symptoms can be other items as well, and this is indicated by block 612.

Next, for each symptom selected for the current rule, a fuzzy set can be defined to identify the degree of fulfillment of the rule, based upon the various parameters. This is indicated by block 614.

A rule priority is then assigned to the selected rule. By way of example, some rules can be more important than others, in different applications. Thus, different rule priorities can be assigned to reflect importance of the rule in the given application. The rule priority can be an absolute number or it can be a category (such as high, medium, low, etc.). Assigning the rule priority is indicated by block 616 in FIG. 6A.

Finally, one or more concrete recommendations are defined for the selected rule. These are the recommendations that will be output to the user, when the rule fires. This is indicated by block 618 in FIG. 6A. The recommendations can take a wide variety of different forms. For instance, they can be fixed recommendations (such as "drive 3 km per hour faster"). This is indicated by block 620. They can be variable recommendations 622, that vary based on a wide variety of different things. They can vary based upon the degree of fulfillment, they can vary based on a combination of items, or they can vary according to a specified function 624. In addition, thresholds can be defined. The recommendation engine can apply the degree of fulfillment of a given rule to a threshold to determine whether the rule is triggered. Applying thresholds is indicated by block 626 in FIG. 6A. The concrete recommendations can be defined in other ways as well, and this is indicated by block 628.

In one exemplary embodiment, the process set out in FIG. 6A is repeated for each enumerated rule. This is indicated by block 630 in FIG. 6A. This completes the configuration of the rules.

A number of examples will now be provided. The following six rules will be discussed for the sake of example only. It will be noted that a great many additional rules or different rules could be enumerated as well.

Rule 1. Ground speed too slow for yield.
Rule 2. Driving too slow while unloading on the go.
Rule 3. Driving slower due to material handling disturbance and/or threat of plugging.
Rule 4. Down crop and cannot drive faster.
Rule 5. Excessive idle time due to grain logistics.
Rule 6. Frequent plugging of the feeder house.

The symptoms that affect each rule can be selected to focus on various pillars, or on various other sensed or derived inputs. By way of example, rule 1 above focuses on the grain productivity pillar. Rule 2 focuses on both the grain productivity and the logistics pillars. Thus, the focus of a given rule can be a single pillar, combinations of pillars, individual or combinations of sensed or derived parameters, or a wide variety of other things.

Selecting a set of symptoms that is to be considered in determining whether a rule is triggered will now be described for Rule 1. The symptoms can include, for instance, a consideration as to whether the grain productivity, as measured against a reference (such as a productivity reference value for the same crop and under the same conditions) is below a threshold level. It can also consider whether the available machine power is fully utilized, and whether the machine is loss limited (which can be indicated when the loss pillar score is high). The average speed in harvesting can also be considered. For instance, recommendation engine 184 may consider whether the average speed is below a reasonable upper threshold (such that the machine could actually go faster and still run with reasonable ride comfort, etc.).

Figure 6B:
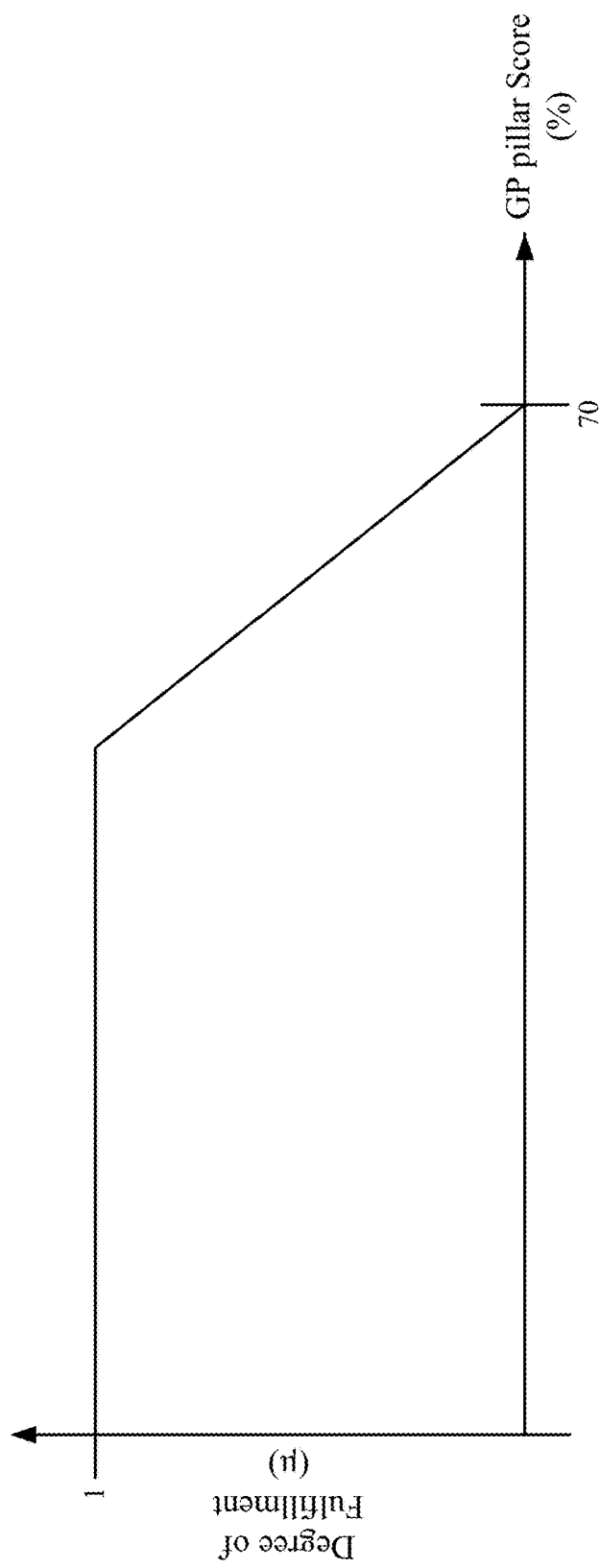

For each of these symptoms, a fuzzy set can be defined that applies to the rule. In one embodiment, the fuzzy set is defined by a border function in a graph that plots degree of fulfillment against a measure of the parameter (or symptom). FIG. 6B, for instance, shows a plot of degree of fulfillment plotted against a grain productivity pillar score, as compared to a reference group. Thus, the percent on the x-axis of the graph shown in FIG. 6B indicates how the grain productivity score compares against the reference group.

Figure 6C:
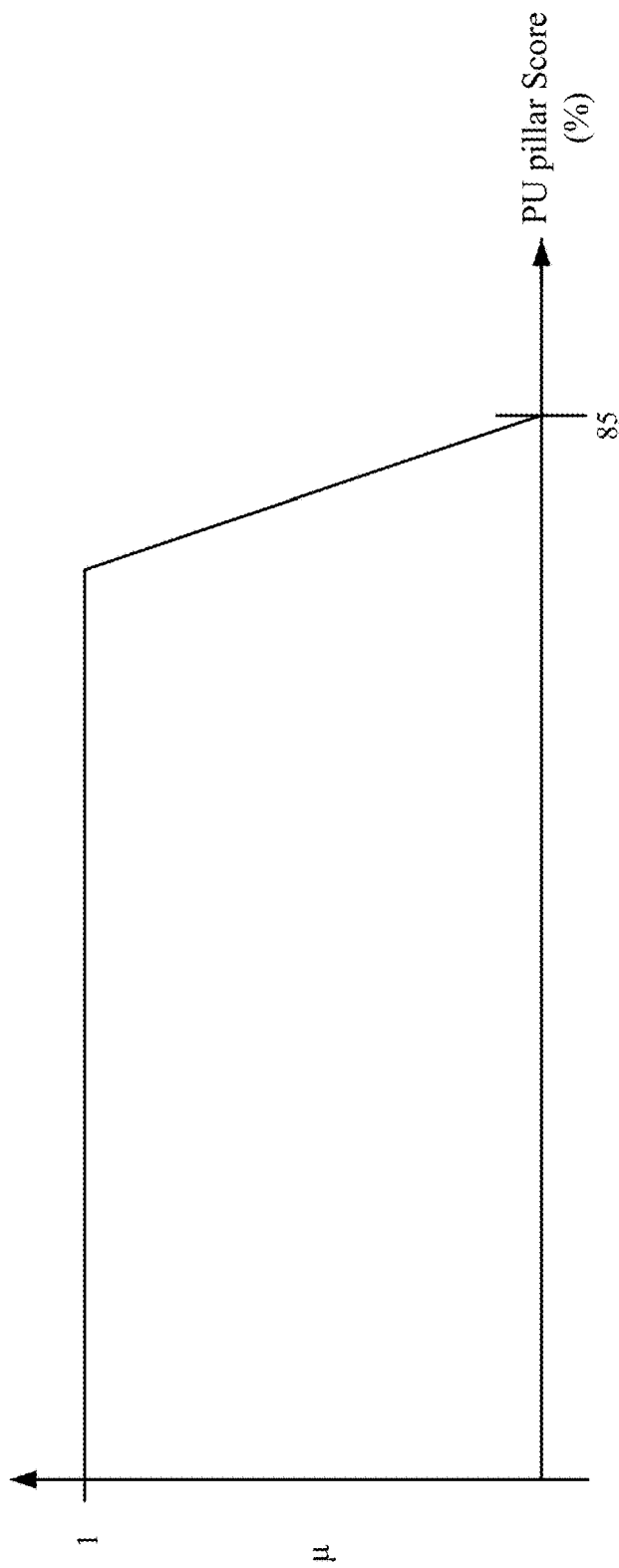
Figure 6D:
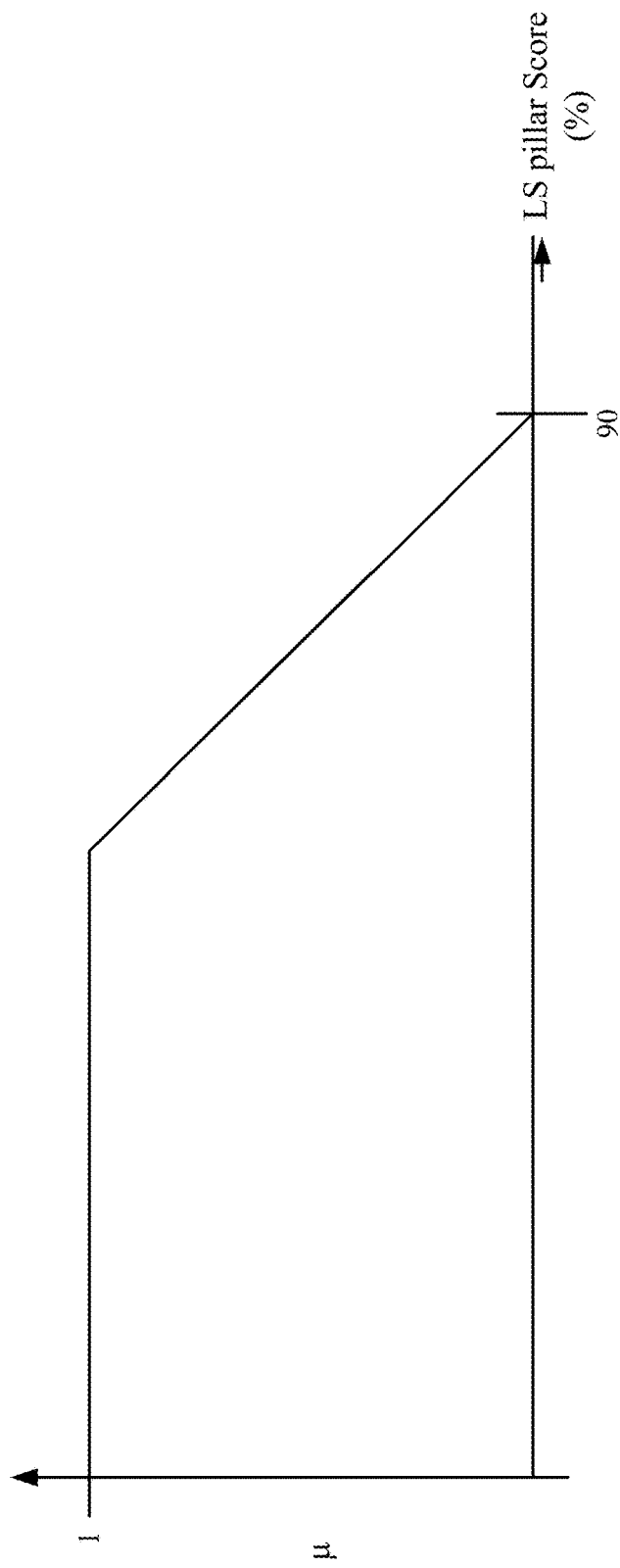

FIG. 6C plots degree of fulfillment against the absolute machine power utilization pillar score. FIG. 6D plots degree of fulfillment against the loss pillar score as measured against a user preference. For the average speed parameter, FIG. 6E plots a degree of fulfillment against the average vehicle speed during harvesting.

Having defined a fuzzy set for each parameter corresponding to rule 1, rule 1 is then assigned a priority. In one embodiment, the priority can be high, medium or low based on the importance of the rule in the given application. The rule priority can be defined in other ways as well.

Next, a concrete recommendation is defined for rule 1. That is, the recommendation defined for rule 1 will be that recommendation that is output by engine 184 if engine 184 determines that rule 1 triggers and that the corresponding recommendation is to be output. While only one recommendation for rule 1 is described, it will be noted that each rule can have a plurality of different recommendations that are selected based on the degree of fulfillment or based on other criteria. In another embodiment, each rule only has a single recommendation. Also, the recommendations can be fixed or variable. For instance, the recommendation for rule 1 may be to drive faster by x kilometers per hour. The x can be a fixed value, or it can be variable based on a wide variety of things. As an example, where x is a variable, it may depend on the distance that the average speed is from the upper speed threshold for the vehicle as set for the rule. It may vary based upon the degree of overall rule fulfillment, or it may vary based upon a combination of things. It can be based upon any other parameter or combination of parameters, or it can be based on a predefined function that is not affected by other parts of the rule.

The same process is then performed with respect to rules 2-6 above. For instance, for rule 2, one consideration may be whether the ratio of productivity (in tons per hour) while harvesting versus the productivity while harvesting and unloading is below average (relative to a reference group in the same crop under the same conditions). Another consideration may be whether the vehicle speed (such as an absolute number in kilometers per hour) is in a given range (such as in a range of 0.1-6 kilometers per hour) to ensure that the rule does not fire if the speed is already high. The degree of fulfillment functions are then defined for each parameter, the rule is assigned a priority, and the recommendation is defined. The recommendation for rule 2 may be, for instance, "speed up by y" where y is fixed or any form of parameter-dependent, or parameter-independent function or where y is scaled based on rule fulfillment, etc.

For rule 3 above, some symptoms to consider may include whether the change rate and/or change deviation of rotor drive pressure is above normal. This may provide content for a report conveying the conditions of the field. Fulfillment functions are defined, the rule is assigned a priority, and a recommendation is defined. For some rules (such as rule 3), there may be no recommendation defined. This rule may only trigger an entry in a report to show context. This can allow a farm manager or another person to interpret other results in the report appropriately. By way of example, the manager may be able to tell that the operator was driving more slowly because of a disturbance in material flow. This might be because of the field conditions, and not the operator. Thus, this context information is provided in the report when this rule fires, but no recommendation is output.

For rule 4 above, the parameters that are considered may be whether grain productivity (measured relative to a reference group) is medium to low, whether the reel position on a combine is down and extended, and whether the machine is harvesting, among others. The degree of fulfillment for each of these parameters can be defined, and the priority can be assigned to the rule. Again, as with rule 3, it may be that no recommendation is generated for rule 4. Instead, when rule 4 fires, it provides content for a report that conveys conditions to allow a person reading the report to interpret other results appropriately. By way of example, a down crop can be caused by heavy rainfall, heavy winds, or other conditions. When this condition exists, the operator may lower the vehicle speed, lower the rotor head, and place the reel down.

For rule 5, some of the parameters to consider can be whether, after one field is completed, the logistic score is below 90%. Another parameter may include whether after a field is completed, the percent of time in idle with a full grain tank (or one that is close to full) is above normal by a threshold amount, relative to a reference value in the same crop and under the same conditions. The degree of fulfillment can be defined for the rule, and it can be assigned a priority. The recommendation may be to investigate crop logistics.

For rule 6 above, some of the parameters to consider may be whether certain trouble codes were generated that indicate the feeder house is plugging. This can be indicated, for instance, by a count of the number of such feeder codes per unit time. If this ratio is above a predefined threshold or is high relative to a reference group, this can cause the rule to fire. The degree of fulfillment can be defined for the rule in other ways, and a priority is assigned to the rule. The recommendation may be to investigate the header setup and settings, because something is wrong that is leading to unusually frequent plugging.

Figure 6F:
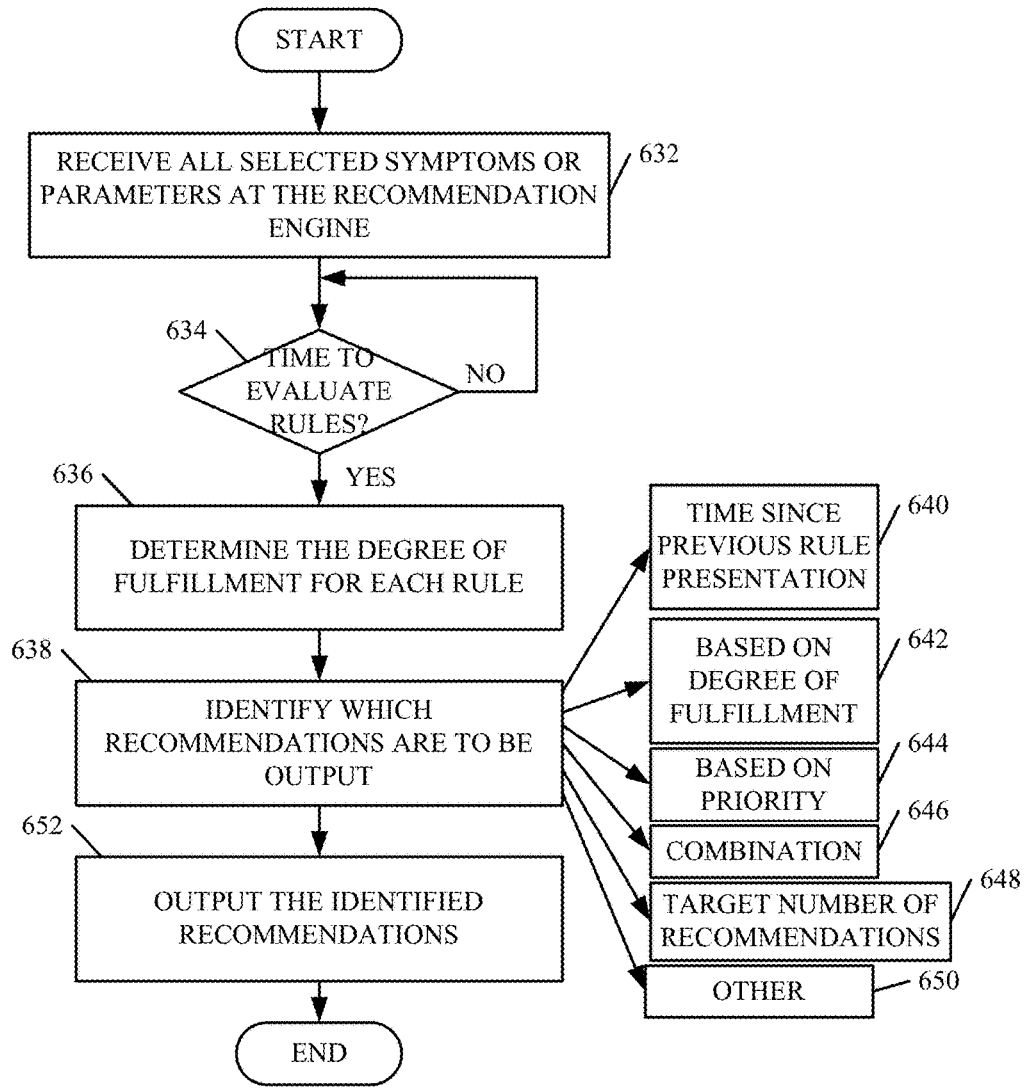
FIG. 6F is a flow diagram illustrating one embodiment of the operation of the recommendation engine in generating recommendations.

FIG. 6F is a flow diagram illustrating one embodiment of the operation of recommendation engine 184 in determining which rules are triggered, and when to present recommendations. Recommendation engine 184 first receives all of the selected symptoms or parameters, for all of the various rules, so they can be evaluated. This is indicated by block 632 in FIG. 6F.

Recommendation engine 184 then determines whether it is time to see if any of the rules are triggered. This is indicated by block 634. This can be done in a wide variety of different ways. For instance, recommendation engine 184 can evaluate the rules periodically. Further, the rule evaluation can be based on sensed conditions. For instance, if one rule is triggered, then other, related rules, may be immediately evaluated. In addition, if certain parameters or values are sensed or derived or are otherwise obtained, this may cause a rule or a subset of rules to be evaluated more often. In any case, recommendation engine 184 determines whether it is time to evaluate the rules.

Recommendation engine 184 then determines the degree of fulfillment for each of the rules that it is evaluating. This is indicated by block 636. This can also be done in a wide variety of different ways. By way of example, for rule 1, the degree of fulfillment for each parameter can be calculated. Then, the overall degree of fulfillment for the entire rule can be generated from the degrees of fulfillment for each parameter. As one example, the degree of fulfillment for the overall rule can be the same as the degree of fulfillment for the weakest parameter. In another embodiment, the degree of fulfillment of the overall rule can be based on a combination of degrees of fulfillment for each of the parameters. The degree of fulfillment can be obtained in other ways as well.

Once the degree of fulfillment of the rules is identified, recommendation engine 184 determines which specific recommendations to output to the operator. This is indicated by block 638 in FIG. 6F. Determining which specific recommendations to output can be based on a variety of different considerations as well.

For instance, if a recommendation was just recently output, recommendation engine 184 may bypass that recommendation for a predetermined time period. This may be done so that recommendation engine 184 is not repeatedly outputting the same recommendations too frequently. This is indicated by block 640 in FIG. 6F.

Determining that a recommendation is to be output can also be based on the degree of fulfillment of its rule. This is indicated by block 642. For example, if a given rule has a very high degree of fulfillment, its corresponding recommendation may be output before the recommendation corresponding to a rule that has a relatively low degree of fulfillment.

Determining whether to output a recommendation can also be based upon the priority assigned to the corresponding rule. This is indicated by block 644. For instance, if a plurality of recommendations are being output for high priority rules, then the recommendations for medium or low priority rules may be held until the high priority rules no longer fire. This is an example only.

Determining which recommendations to provide can be based on combinations of the rule priority, its degree of fulfillment, the time since the recommendation was last provided, or combinations of other things as well. This is indicated by block 646.

In addition, it should be noted that recommendation engine 184 may be configured to provide only a target number of recommendations at any given time. Thus, the highest priority recommendations can be output in descending order until the target number of recommendations is reached. This is indicated by block 648 in FIG. 6F. The recommendation engine 184 can determine which recommendations to output in other ways as well. This is indicated by block 650.

Further, in one embodiment, conflicting recommendations are identified and the conflicts are resolved before the recommendations are output. Conflicts can be resolved in a wide variety of different ways. For instance, when the recommendations are prioritized, the conflict can be resolved based on priority. Priority can be assigned anecdotally, heuristically, based on weights or underlying information or otherwise. Conflicts can also be resolved using a predetermined recommendation hierarchy that establishes a recommendation precedence. Conflicts can be resolved by accessing a set of conflict resolution rules. The rules can be static, context-dependent or dynamic. Conflicts can be resolved in other ways as well.

Once the recommendations that are to be output are identified, recommendation engine 184 outputs the identified recommendations. This is indicated by block 652 in FIG. 6F.

It should also be noted that the parameters considered for each rule need not be those generated from complex computation. Instead, they can be obtained from all levels of data aggregation in FIG. 1. Thus, some may be defined in engineering units, instead of other measures. By way of example, the parameters considered for rule 1 can be grain mass flow in tons per hectare, engine load factor in percent, loss sensor readings (for example, in shoe loss strikes), and ground speed in kilometers per hour. The parameter considered for rule 2 may be provided as the ratio of mass flow while the auger is off versus on (in tons per hour). The parameter considered for rule 3 may be provided as the rotor drive pressure change (in bar). The parameters considered for rule 4 can be the grain mass flow in tons per hour, the ground speed in kilometers per hour, reel position down and header position down. The parameters considered for rule 5 can be whether the grain tank fill level is constant and over 95% and not changing for at least a given time period (such as 30 seconds). The parameter considered for rule 6 can be the diagnostic trouble code count. Of course, other, more complex parameters can be used as well.

Figure 6G:
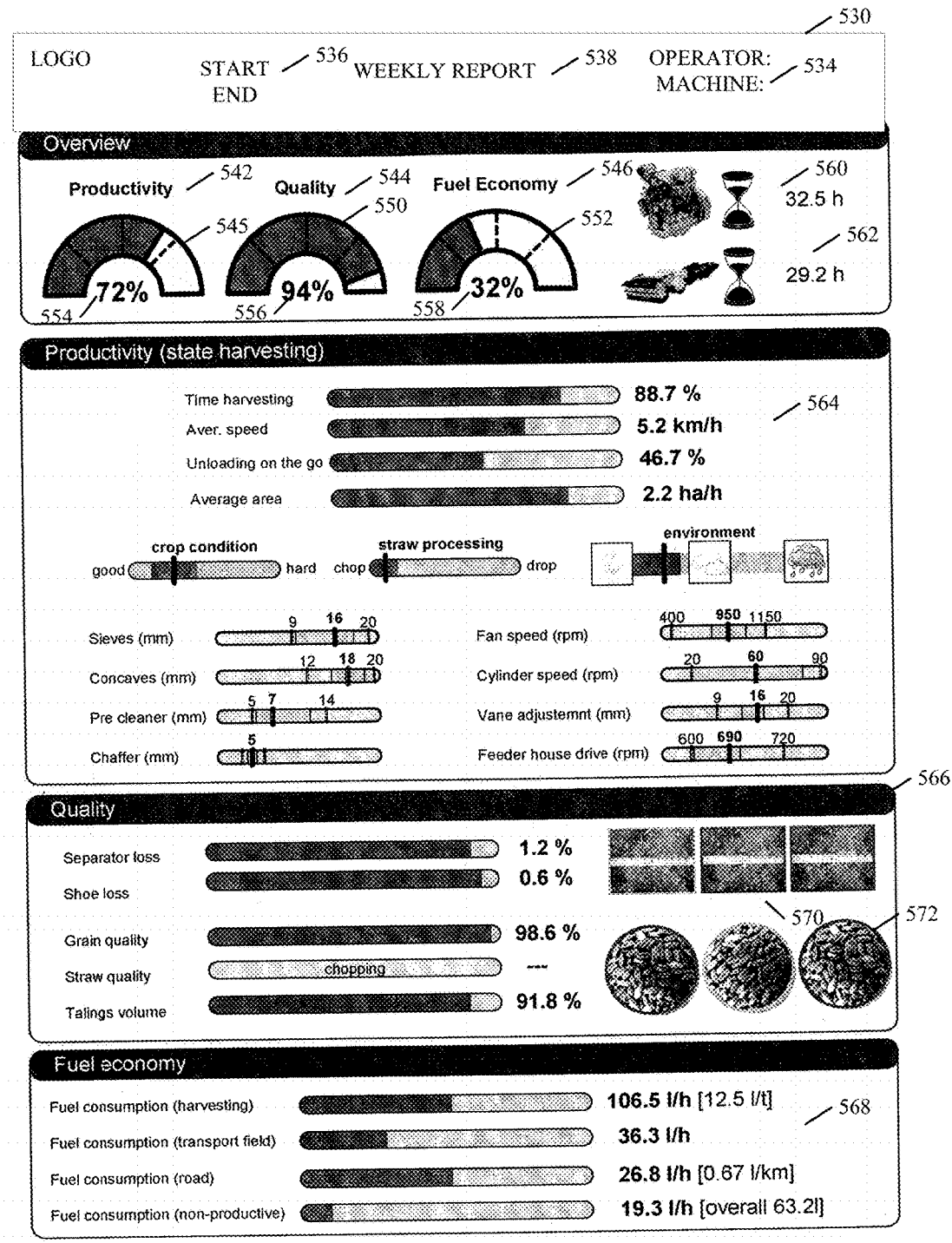
FIG. 6G is one exemplary user interface display that illustrates one exemplary operator performance report format.

FIG. 6G shows one embodiment of an exemplary report format for an operator performance report 110. The report format shown FIG. 6G is exemplary only, and is indicated by number 530. Also, it will be appreciated that each of the sections in FIG. 6G can be modified either by the user, by an administrator or by other personnel, in order to show different information, as desired.

The report format 530 can illustratively include a user-branded, or manufacture-branded section 532. It may include operator and machine identifier section 534 that identifies the particular operator 101 and the particular machine 102 that the operator is operating. It can include a date range section 536 that shows the date range for the report, and a report frequency indicator 538 that indicates how frequently the report is generated. In the embodiment shown in FIG. 6G, report format 530 is only reporting information for three of the five performance pillar score categories described above. It is reporting information for the productivity performance pillar, the material quality performance pillar and the fuel consumption (or fuel economy) performance pillar. It will be appreciated, of course, that additional or fewer performance pillars can be included in the report format as well, and those shown are shown for exemplary purposes only.

FIG. 6G shows that the report format 530 includes an overview section 540. Overview section 540 illustratively includes a set of performance pillar score indicators 542, 544 and 546. The score indicators shown in FIG. 6G are shown as gauges 548, 550 and 552 with a corresponding numerical performance score indicator 554, 556 and 558. It will be appreciated that the particular displays shown in FIG. 6G are exemplary only and others could be used.

In the embodiment shown in FIG. 6G, overview section 540 also includes a set of hour indicators 560 and 562 that indicate the time of operation of components that are deemed of interest by the user. In one embodiment, for example, hour indicator 560 indicates the number of engine hours that operator 101 used, for the information in the current report. Other hour indicators can be used as well.

FIG. 6G also shows that, in one embodiment, for each pillar score shown in the overview section 540, a more detailed section is provided as well. For instance, FIG. 6G includes a productivity detail section 564, a quality detail section 566 and a fuel economy detail section 568.

Productivity detail section 564 includes detailed information about the various items sensed or computed in generating the overall productivity performance pillar score shown in the overview section 540. It thus includes information indicative of the time spent harvesting, the average speed, the percent of time that the operator was unloading on the go (such as while harvesting) and the average area per hour covered by the user. It can also provide indicators indicative of the crop condition, the relative amount of time spent chopping or dropping, and the overall environmental conditions. Further, it can include a machine settings section indicating what the machine settings were (such as for the sieves, the concaves, the pre-cleaner and chaffer, etc.) along with a sensing section indicative of various sensed parameters (such as fan speed, cylinder speed, vane adjustment and feeder house drive RPMs, etc.).

In the embodiment shown in FIG. 6, quality detail section 566 illustratively includes more detailed information that was used in generating the quality performance pillar score. For instance, it can include detailed information regarding overall separator loss, shoe loss, grain quality, straw quality and tailings volume. It can also illustratively include images sections that show photographic images taken by the operator or otherwise. For instance, images section 570 shows images that were taken and that relate to separator and shoe loss. Images section 572 includes images that were taken and are relevant to grain quality.

In the embodiment shown in FIG. 6G, fuel economy detail section 568 includes detailed information that was used in generating the fuel economy performance pillar score shown in overview section 540. Therefore, it can include such things as overall fuel consumption while harvesting, while transporting within the field, while traveling on the road, and non-productive fuel consumption. Of course, it can include other information as well. It will be appreciated that this is only one embodiment of a report format. A wide variety of others can be used as well.

In another embodiment, the performance results can also be provided plotted over a field map generated from, for example, a satellite image of the field. The plotted results can include each metric (the five pillar scores) and the composite score. The plot can show (at the same time or selectively) other information as well. This will thus show how the operator performed at different locations in the field.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
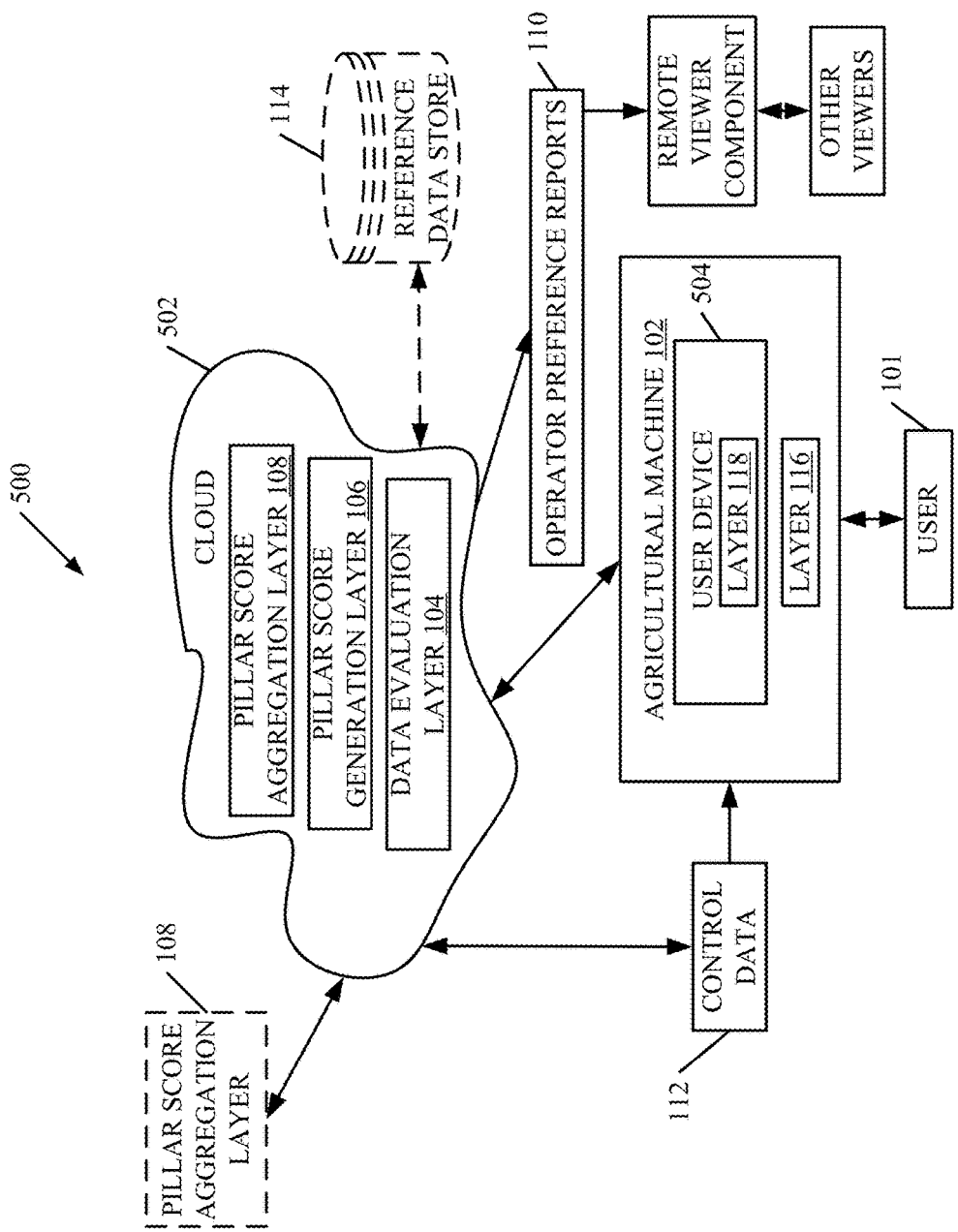
FIG. 7 is a block diagram showing one embodiment of the architecture shown in FIGS. 1 and 2, deployed in a cloud computing architecture.

FIG. 7 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 7, some items are similar to those shown in FIGS. 1 and 2 and they are similarly numbered. FIG. 7 specifically shows that layers 104, 106 and 108 can be located in cloud 502 (which can be public, private, or a combination where portions are public while others are private). Therefore, user 101 can operate machine 102 using a user device 504 that includes layer 118. Machine 102 can access layers 104, 106 and 108 through cloud 502.

FIG. 7 also depicts another embodiment of a cloud architecture. FIG. 7 shows that it is also contemplated that some elements of architecture 100 are disposed in cloud 502 while others are not. By way of example, data store 114 can be disposed outside of cloud 502, and accessed through cloud 502. In another embodiment, layer 108 (or other layers) can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

Further, FIG. 7 shows that a remote view component 507 (which can be another user device, or another component) can be used by one or more other viewers 509, who are remote from machine 102. Viewers 509 can view the reports or other information if properly authenticated.

It will also be noted that architecture 100, or portions of it, can be disposed on a wide variety of different devices. Some of those devices include servers, desktop computers, laptop computers, tablet computers, or other mobile devices, such as handheld computers, cell phones, smart phones, multimedia players, personal digital assistants, etc.

Figure 8:
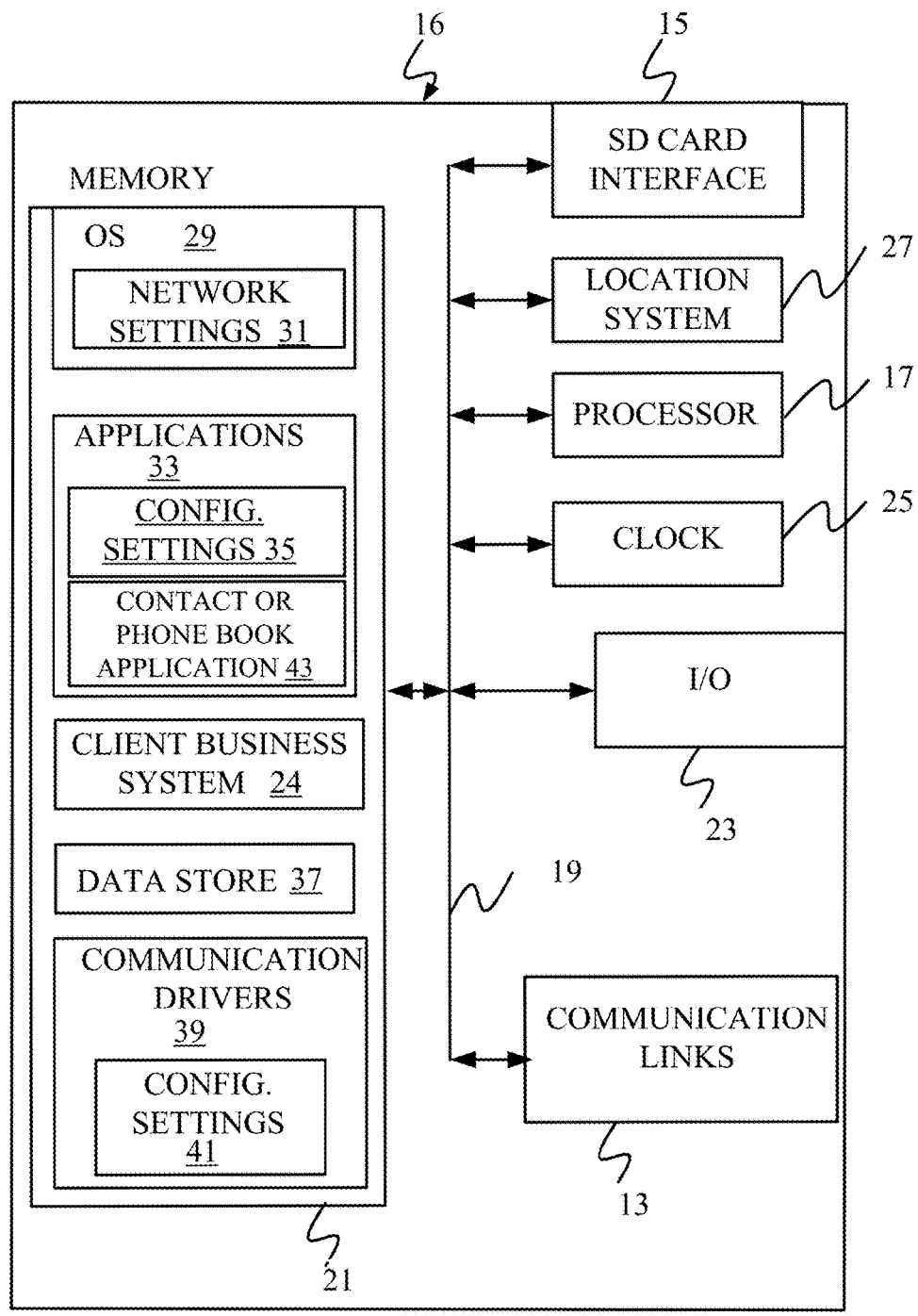
FIGS. 8-13 show various embodiments of mobile devices that can be used in the architecture shown in FIGS. 1 and 2.

FIG. 8 is a simplified block diagram of one illustrative embodiment of a handheld or mobile computing device that can be used as a user's or client's hand held device 16, in which the present system (or parts of it) can be deployed. FIGS. 9-13 are examples of handheld or mobile devices.

FIG. 8 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including wireless connections to networks.

Under other embodiments, applications or systems are received on a removable Secure Digital (SD) card that is connected to a SD card interface 15. SD card interface 15 and communication links 13 communicate with a processor 17 (which can also embody processors 140, 155, 163 or 186 from FIG. 2) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 9:
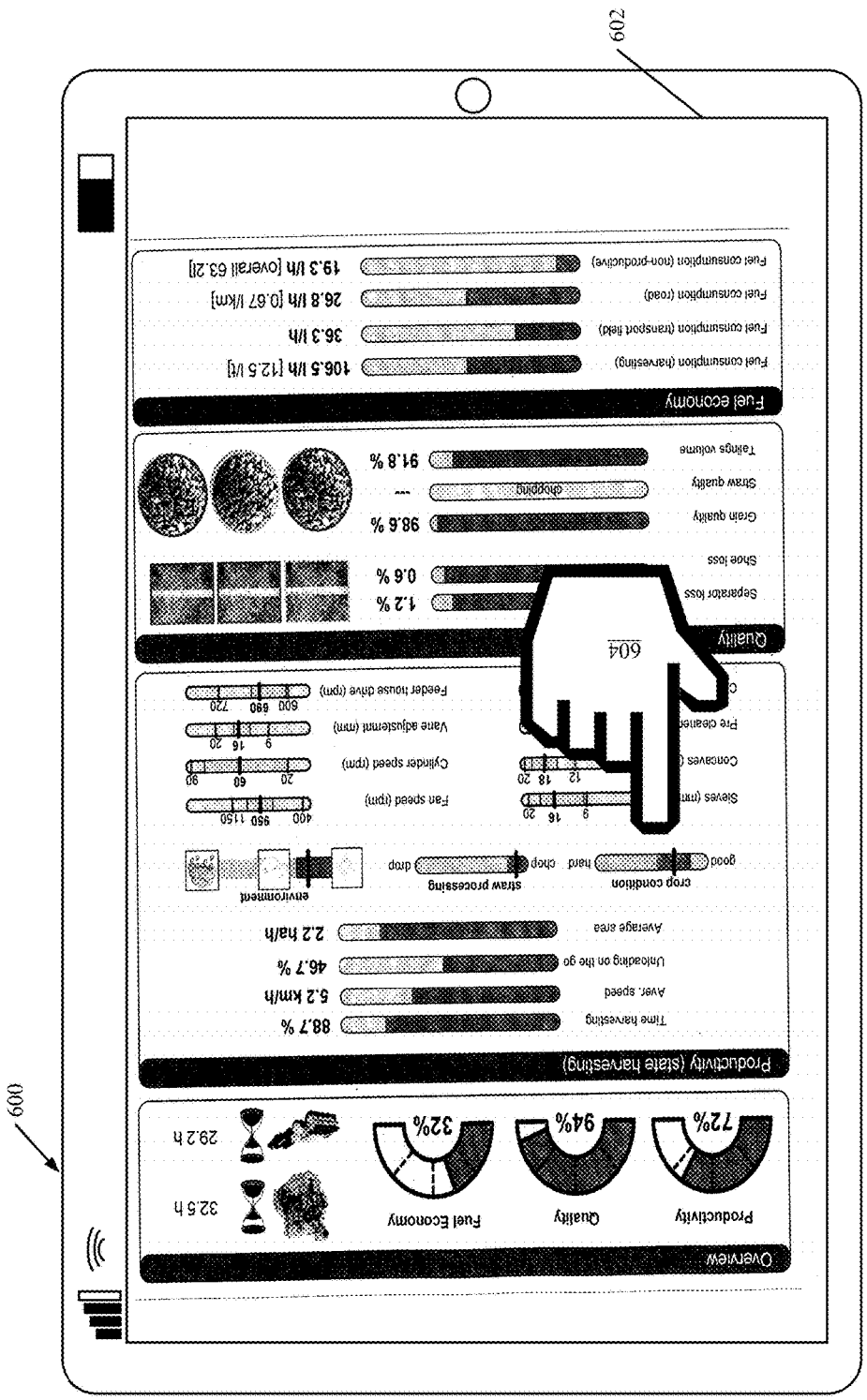

FIG. 9 shows one embodiment in which device 16 is a tablet computer 600. In FIG. 9, computer 600 is shown with user interface display 530 (From FIG. 6) displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 10:
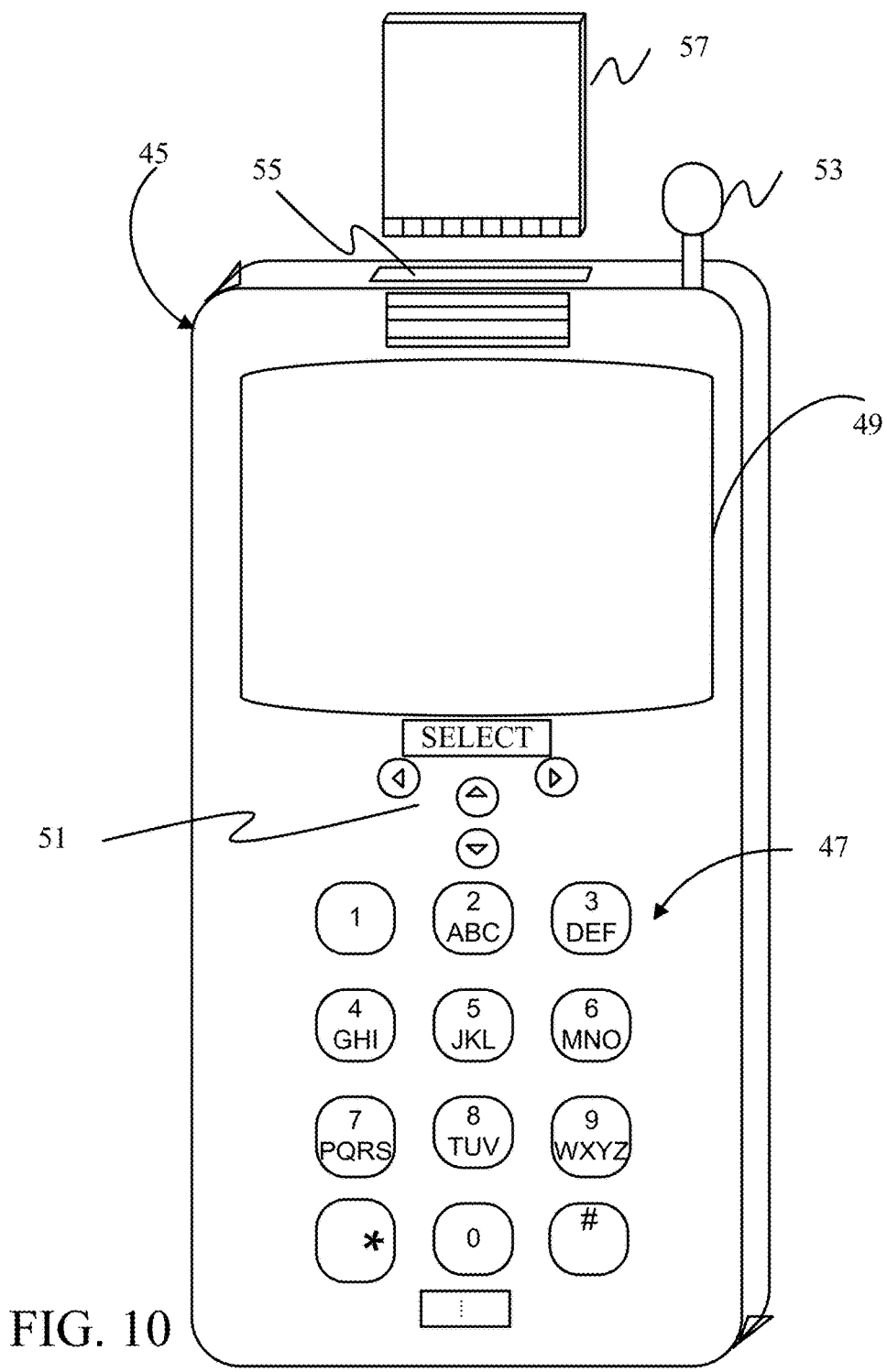
Figure 11:
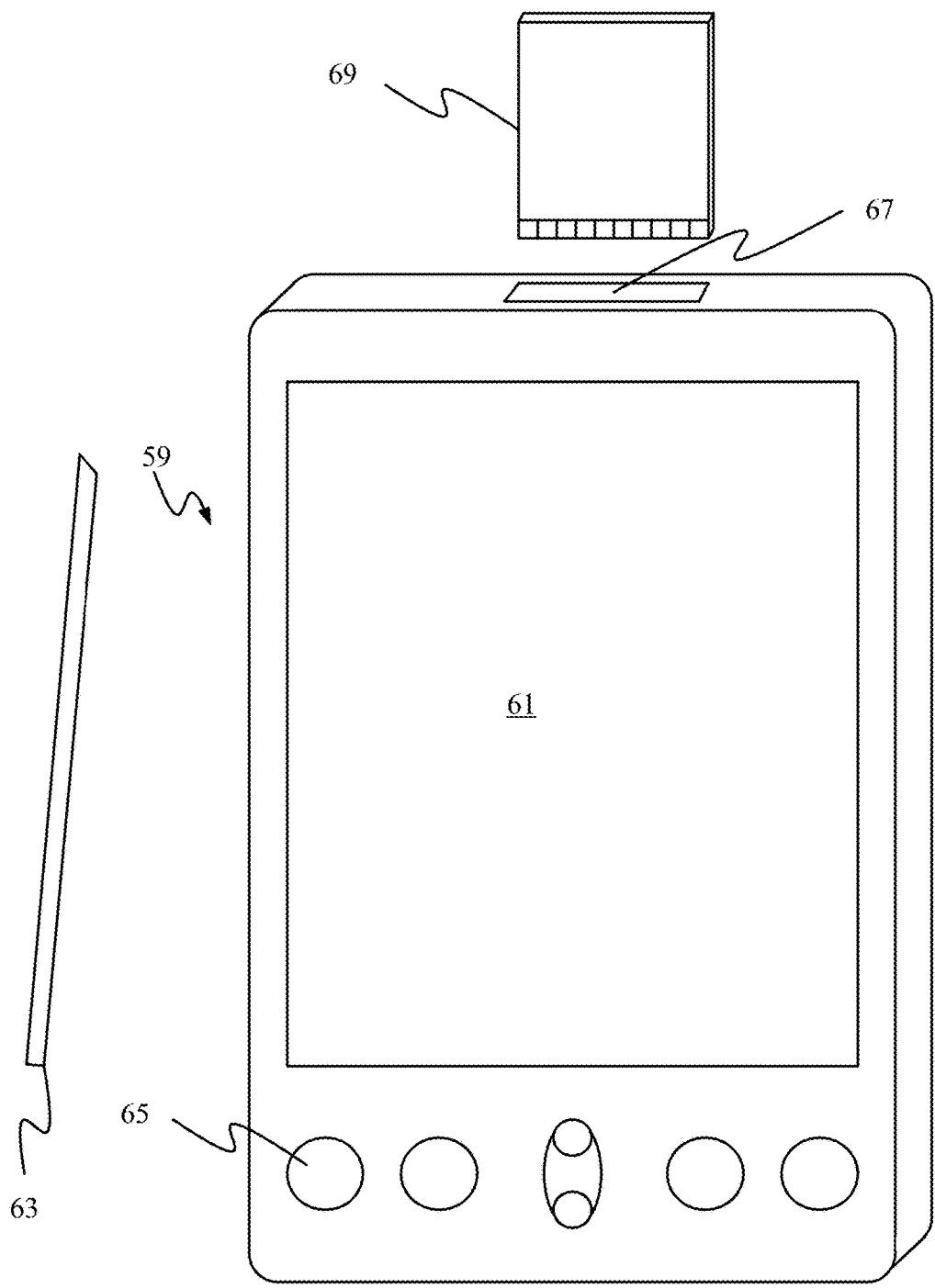

FIGS. 10 and 11 provide additional examples of devices 16 that can be used, although others can be used as well. In FIG. 10, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 11 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 12:
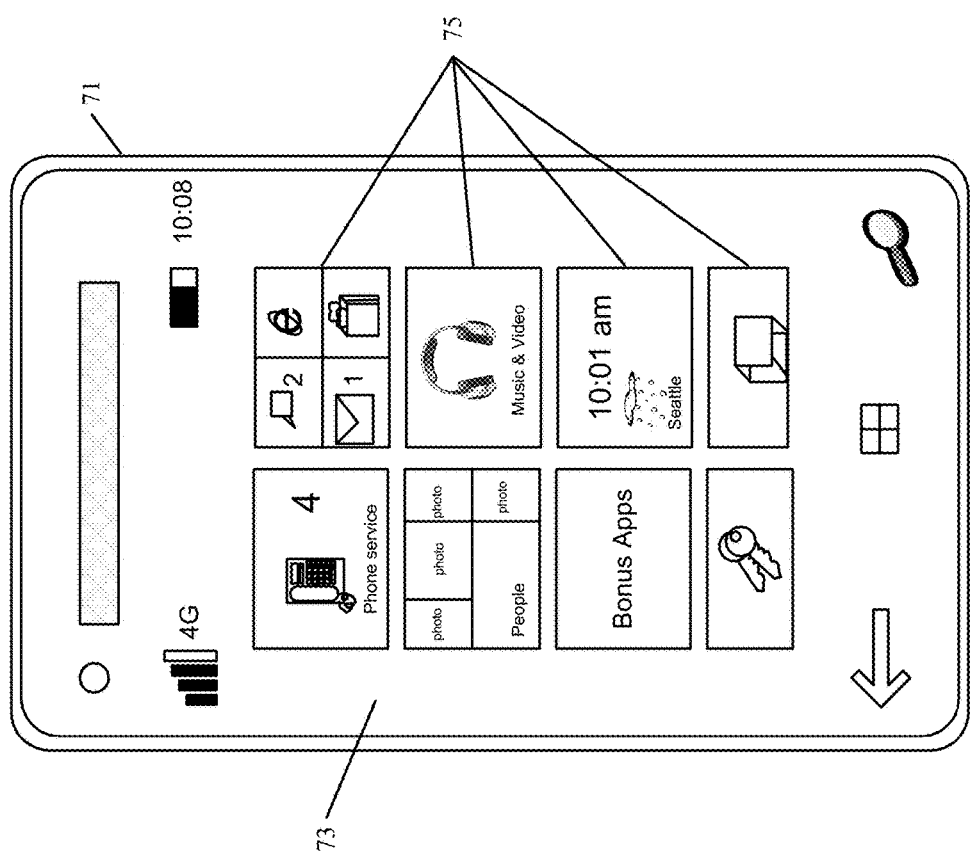
Figure 13:
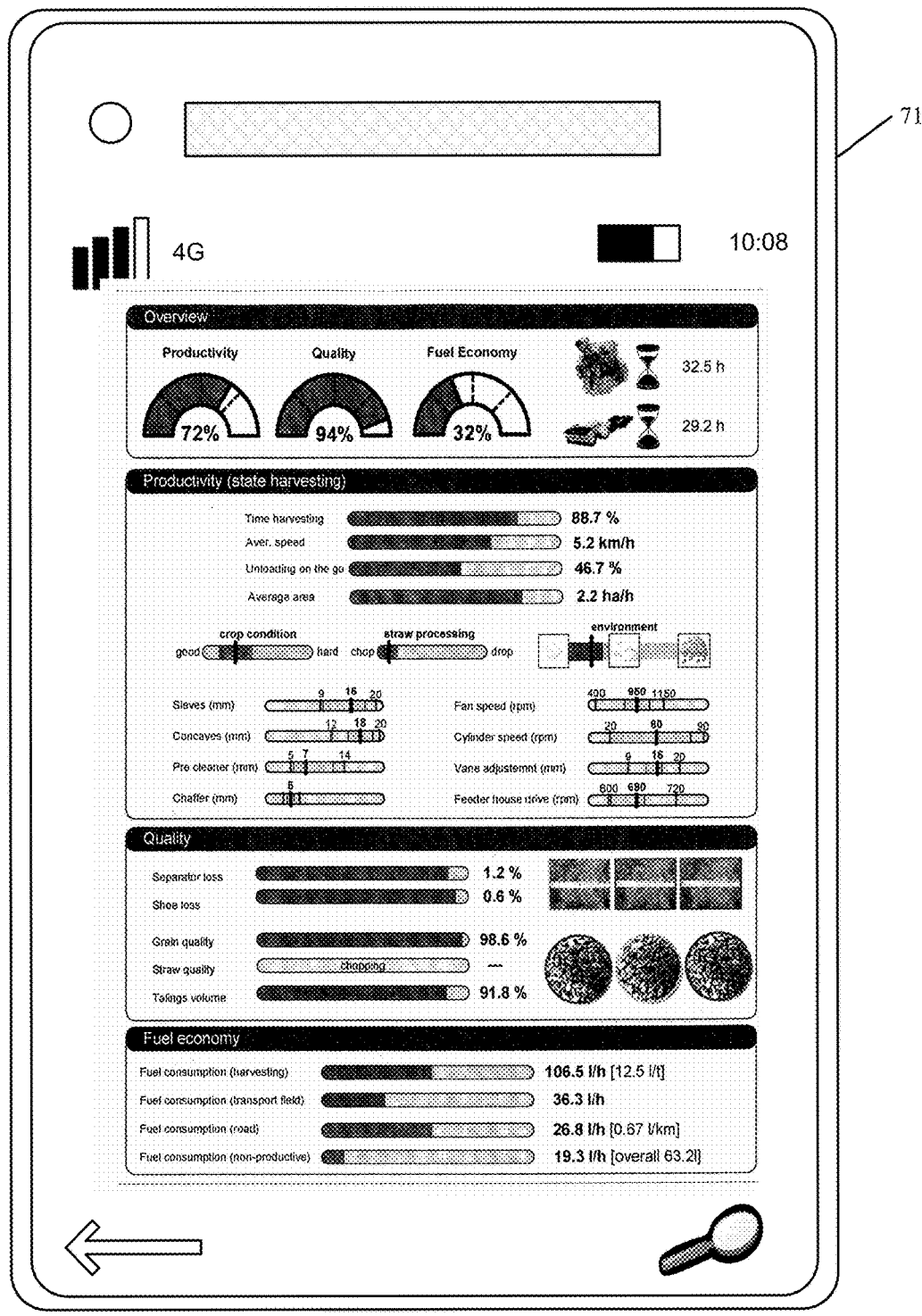

FIG. 12 is similar to FIG. 10 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. FIG. 13 shows phone 71 with the display of FIG. 6 displayed thereon.

Note that other forms of the devices 16 are possible.

Figure 14:
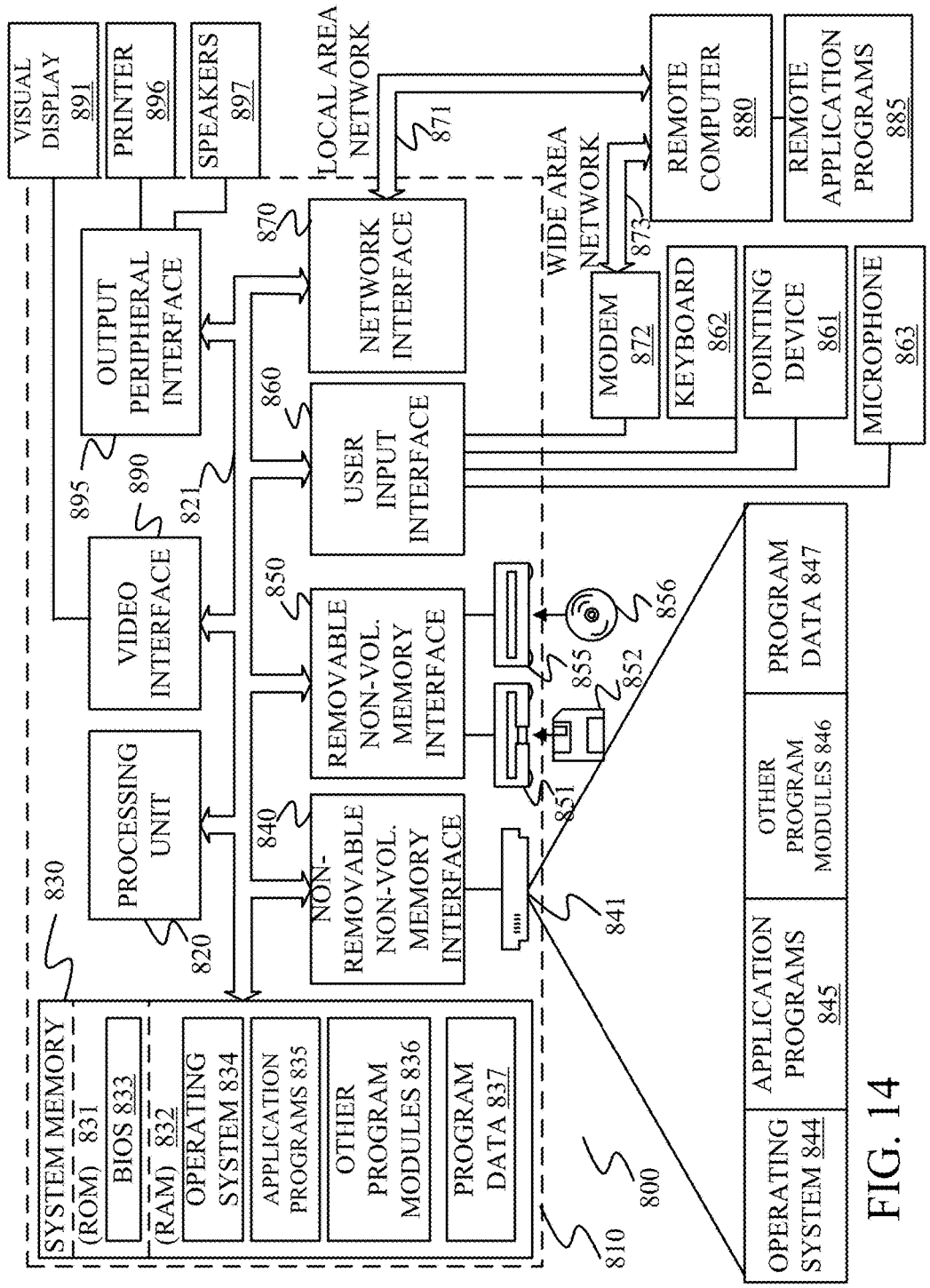
FIG. 14 is a block diagram of one illustrative computing environment which can be used in the architecture shown in FIGS. 1, 2 and 7.

FIG. 14 is one embodiment of a computing environment in which architecture 100, or parts of it, (for example) can be deployed. With reference to FIG. 14, an exemplary system for implementing some embodiments includes a general-purpose computing device in the form of a computer 810. Components of computer 810 may include, but are not limited to, a processing unit 820 (which can comprise processor 140, 155, 163 or 186), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIGS. 1 and 2 can be deployed in corresponding portions of FIG. 14.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 14 illustrates operating system 834, application programs 835, other program modules 836, and program data 837.

The computer 810 may also include other removable/non-removable volatile/nonvolatile computer storage media. By way of example only, FIG. 14 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 810. In FIG. 10, for example, hard disk drive 841 is illustrated as storing operating system 844, application programs 845, other program modules 846, and program data 847.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 14 include a local area network (LAN) 871 and a wide area network (WAN) 873, but may also include other networks.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 14 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, comprising:
    detecting a speed of an agricultural machine, using a mobile machine speed sensor, and generating a speed signal indicative of the detected speed of the agricultural machine while a given operator is operating the agricultural machine;
    detecting a configuration of the agricultural machine, using a machine configuration identifier, and generating a machine configuration signal indicative of the detected machine configuration;
    detecting a mass flow of material through the agricultural machine, using a mass flow sensor, and generating a mass flow signal indicative of the detected mass flow of material;
    receiving, at a productivity computation component, the speed signal, the machine configuration signal and the mass flow signal and calculating a grain productivity for the agricultural machine;
    controlling, with a processor, a grain productivity fuzzy logic evaluation mechanism to evaluate a comparison of the grain productivity for the agricultural machine to reference data, and, based on the evaluation, generate a value indicative of a productivity performance of the given operator;
    controlling, with the processor, a grain productivity metric generator to generate a productivity pillar score based on the value indicative of the productivity performance;
    controlling, with the processor, an engine to identify a rule corresponding to an actionable condition and determine a degree of fulfillment of the rule based on the productivity pillar score;
    generating control data indicative of the degree of fulfillment of the rule corresponding to the actionable condition;
    generating a control signal that controls an output component to output a control recommendation, based on the control data, wherein the control recommendation modifies an operating characteristic of the agricultural machine to modify the degree of fulfillment of the rule corresponding to the actionable condition.

2. The computer-implemented method of claim 1, further comprising:
    outputting a control recommendation, on a user interface device, to the operator based on the degree of fulfillment of the rule corresponding to the actionable condition.

3. The computer-implemented method of claim 2, wherein the control recommendation comprises a recommendation to modify an operating characteristic of the agricultural machine to reduce the degree of fulfillment of the rule corresponding to the actionable condition.

4. The computer-implemented method of claim 2, wherein the control recommendation varies based on the degree of fulfillment of the rule.

5. The computer-implemented method of claim 2, wherein the control recommendation varies according to a predefined function associated with the rule.

6. The computer-implemented method of claim 2, wherein the control recommendation is a fixed recommendation that is the same type regardless of the degree of fulfillment of the rule.

7. The computer-implemented method of claim 1, wherein identifying the rule corresponding to the actionable condition comprises:
    identifying the rule, corresponding to the actionable condition, from an enumerated set of rules based on a priority of the rule.

8. The computer-implemented method of claim 7, wherein the engine is configured to determine a degree of fulfillment for each rule within the enumerated set of rules.

9. The computer-implemented method of claim 8, wherein the engine is configured to determine the degree of fulfillment for each rule within the enumerated set of rules based on a plurality of pillar scores.

10. The computer-implemented method of claim 1, wherein generating control data indicative of the degree of fulfillment of the rule comprises:
- determining an amount of time since control data was last generated for the rule; and
- based on the determination, generating the control data to perform automated, closed loop control of the agricultural machine.

11. The computer-implemented method of claim 1, wherein modifying the degree of fulfillment comprises decreasing the degree of fulfillment.

12. The computer-implemented method of claim 1, wherein generating the control signal comprises generating the control signal to perform automated, closed loop control of the agricultural machine based on the degree of fulfillment of the rule corresponding to the actionable condition.

13. A computer system, comprising:
- a time sensor configured to sense an operating time of an agricultural machine;
- a machine state sensor configured to sense a machine state of the agricultural machine;
- a speed sensor configured to sense a speed of the agricultural machine;
- a processor configured to calculate a distance the agricultural machine travels in each machine state and a time the agricultural machine is in each machine state based on the operating time, machine state and speed of the agricultural machine;
- a fuzzy logic controller configured to evaluate a comparison of the output of the processor to reference data, and, based on the evaluation, generate a value indicative of a performance of an operator of the agricultural machine in regards to a logistics metric;
- a logistics metric generator configured to receive the value from the fuzzy logic controller and generate a logistics pillar score based on the value;
- an engine configured to receive the logistics pillar score, identify a rule corresponding to an actionable condition and determine a degree of fulfillment of the rule based on the logistics pillar score; and
- a control system configured to generate control signals based on the determined degree of fulfillment of the rule that controls an output component to output a control recommendation, wherein the control recommendation modifies an operating characteristic of the agricultural machine to modify the degree of fulfillment of the rule corresponding to the actionable condition.

14. The computer system of claim 13, further comprising:
- a user interface device that indicates control recommendation based on the determined degree of fulfillment of the rule corresponding to the actionable condition.

15. The computer system of claim 13 and further comprising:
- a plurality of different pillar score generators, each generating a different performance pillar score indicative of a relative performance of the operator in a given one of a plurality of different performance categories, relative to a performance level represented by a set of reference data in the given performance category, the engine receiving the performance pillar scores and determining a degree of fulfillment for a plurality of rules corresponding to actionable conditions based on the performance pillar scores.

16. The computer system of claim 13 wherein the control system generates the control signals in order to reduce the degree of fulfillment of the rule.

17. The computer system of claim 13, wherein the engine is configured to identify the rule, corresponding to the actionable condition, from an enumerated set of rules based on a priority of the rule.

18. The computer system of claim 17, wherein the engine is configured to determine a degree of fulfillment for each rule, within the enumerated set of rules, periodically during operation of the agricultural machine.

19. The computer system of claim 17, wherein the engine identifies the rule corresponding to the actionable condition based on the priority and a previously evaluated rule within the enumerated set of rules.

20. The computing system of claim 17, wherein the engine identifies the rule corresponding to the actionable condition based on the priority and a sensed operating condition of the agricultural machine.

21. A mobile machine, comprising:
- a shoe loss sensor configured to sense a shoe loss of the agricultural machine;
- a separator loss sensor configured to sense a separator loss of the agricultural machine;
- a tailings volume sensor configured to sense a volume of tailings of the agricultural machine;
- a mass flow sensor configured to sense a mass flow of material through the agricultural machine;
- a processor configured to break the sensed shoe loss, separator loss and mass flow into discrete timeframes and generate an output indicative of the broken sensed shoe loss, separator loss and mass flow;
- a fuzzy logic controller configured to receive the output from the processor and evaluate a comparison of the output to reference data, and, based on the evaluation, generate a value indicative of a performance of an operator of the agricultural machine in regards to a material loss metric;
- a grain loss metric generator configured to receive the value from the fuzzy logic controller and generate a material loss pillar score based on the value;
- an engine configured to receive the material loss pillar score, identify a rule corresponding to an actionable condition and determine a degree of fulfillment of the rule based on the material loss pillar score; and
- a control system configured to generate control signals based on the determined degree of fulfillment of the rule that controls an output component to cutout a control recommendation, wherein the control recommendation modifies an operating characteristic of the agricultural machine to modify the degree of fulfillment of the rule corresponding to the actionable condition.

22. The mobile device of claim 21, further comprising:
- a user interface device that indicates a control recommendation based on the determined degree of fulfillment of the rule corresponding to the actionable condition.

23. The mobile machine of claim 21 wherein the control system generates the control signals based on the degree of fulfillment and a priority of the rule corresponding to the actionable condition.

* * * * *